US008446394B2

(12) United States Patent
Stewart

(10) Patent No.: US 8,446,394 B2
(45) Date of Patent: May 21, 2013

(54) PIXEL CIRCUITS AND METHODS FOR DRIVING PIXELS

(75) Inventor: Roger Stewart, Hillsborough, NJ (US)

(73) Assignee: Visam Development L.L.C., Wilmington, DE (US)

( * ) Notice: Subject to any disclaimer, the term of this patent is extended or adjusted under 35 U.S.C. 154(b) by 527 days.

(21) Appl. No.: 11/759,817

(22) Filed: Jun. 7, 2007

(65) Prior Publication Data

US 2008/0062091 A1 Mar. 13, 2008

Related U.S. Application Data

(60) Provisional application No. 60/805,058, filed on Jun. 16, 2006.

(51) Int. Cl.
*G06F 3/038* (2006.01)
*G09G 5/00* (2006.01)

(52) U.S. Cl.
USPC ............. 345/204; 345/76; 345/82; 315/169.3

(58) Field of Classification Search
USPC ............. 345/204, 76-83; 315/169.3; 313/463
See application file for complete search history.

(56) References Cited

U.S. PATENT DOCUMENTS

| | | | | |
|---|---|---|---|---|
| 5,686,935 | A * | 11/1997 | Weisbrod | 345/100 |
| 5,751,279 | A * | 5/1998 | Okumura | 345/212 |
| 6,157,356 | A | 12/2000 | Troutman | 345/82 |
| 6,229,506 | B1 | 5/2001 | Dawson et al. | 345/82 |
| 6,229,508 | B1 | 5/2001 | Kane | 345/82 |
| 6,307,322 | B1 | 10/2001 | Dawson et al. | 315/169.1 |
| 6,594,606 | B2 | 7/2003 | Everitt | 702/107 |
| 6,611,107 | B2 | 8/2003 | Mikami et al. | 315/169.1 |
| 6,618,030 | B2 * | 9/2003 | Kane et al. | 345/82 |
| 6,693,385 | B2 | 2/2004 | Koyama | 315/169.1 |
| 6,734,636 | B2 | 5/2004 | Sanford et al. | 315/169.3 |
| 6,809,706 | B2 * | 10/2004 | Shimoda | 345/55 |
| 6,839,045 | B2 | 1/2005 | Ozawa et al. | 345/92 |
| 6,847,340 | B2 | 1/2005 | Wang et al. | 345/76 |
| 6,864,639 | B2 | 3/2005 | Ito | 315/169.3 |

(Continued)

FOREIGN PATENT DOCUMENTS

| | | | |
|---|---|---|---|
| WO | 02/091341 | A2 | 11/2002 |
| WO | 03/034390 | A2 | 4/2003 |

OTHER PUBLICATIONS

Office Action Summary from U.S. Appl. No. 11/759,806 mailed on Oct. 15, 2008.

(Continued)

*Primary Examiner* — Kevin M Nguyen
*Assistant Examiner* — Kenneth B Lee, Jr.
(74) *Attorney, Agent, or Firm* — Christensen O'Connor Johnson Kindness PLLC

(57) ABSTRACT

A display driver according to one embodiment includes a digital to analog converter producing a current at a selected level an output of the digital to analog converter being coupleable to a data line of a display; and a voltage source being coupleable to the data line for precharging the data line. A method for precharging a data line of a display according to another embodiment includes determining a voltage level on a data line during a frame period; storing the voltage level; and prior to or during a subsequent frame period, precharging the data line voltage to a derivative of the stored voltage level. Additional systems and methods are claimed.

18 Claims, 17 Drawing Sheets

U.S. PATENT DOCUMENTS

| | | | | |
|---|---|---|---|---|
| 6,885,356 | B2 | 4/2005 | Hashimoto | 345/77 |
| 6,897,843 | B2 | 5/2005 | Ayres et al. | 345/90 |
| 6,930,680 | B2 | 8/2005 | Miyazawa | 345/205 |
| 6,943,500 | B2 | 9/2005 | LeChevalier | 315/169.3 |
| 6,943,761 | B2 | 9/2005 | Everitt | 345/82 |
| 6,963,321 | B2 | 11/2005 | Everitt | 345/82 |
| 6,965,360 | B2 | 11/2005 | DeCaro et al. | 345/76 |
| 6,970,149 | B2 | 11/2005 | Chung et al. | 345/82 |
| 6,972,742 | B2 | 12/2005 | Dennehey | 345/76 |
| 6,989,826 | B2 * | 1/2006 | Kasai | 345/204 |
| 7,079,130 | B2 * | 7/2006 | LeChevalier | 345/215 |
| 7,382,341 | B2 | 6/2008 | Park | |
| 7,463,229 | B2 * | 12/2008 | Morita | 345/87 |
| 7,477,248 | B2 | 1/2009 | Johnson | |
| 7,570,242 | B2 * | 8/2009 | Kwon | 345/98 |
| 2001/0024186 | A1 | 9/2001 | Kane et al. | 345/98 |
| 2002/0047568 | A1 | 4/2002 | Koyama | 315/169.3 |
| 2003/0016201 | A1 | 1/2003 | Ayres et al. | 345/98 |
| 2003/0038760 | A1 * | 2/2003 | Kim et al. | 345/76 |
| 2003/0090446 | A1 | 5/2003 | Tagawa et al. | 345/76 |
| 2003/0095087 | A1 | 5/2003 | Libsch et al. | 345/82 |
| 2003/0107565 | A1 | 6/2003 | Libsch et al. | 345/211 |
| 2003/0111966 | A1 | 6/2003 | Mikami et al. | 315/169.3 |
| 2003/0128200 | A1 | 7/2003 | Yumoto | 345/211 |
| 2003/0151564 | A1 * | 8/2003 | Yamashita et al. | 345/52 |
| 2004/0012550 | A1 | 1/2004 | Koyama | 345/76 |
| 2004/0017162 | A1 | 1/2004 | Sato et al. | 315/169.3 |
| 2004/0021620 | A1 | 2/2004 | Mikami et al. | 345/30 |
| 2004/0041766 | A1 | 3/2004 | Nakao et al. | 345/89 |
| 2004/0080470 | A1 | 4/2004 | Yamazaki et al. | 345/76 |
| 2004/0087066 | A1 | 5/2004 | Voutsas | 438/147 |
| 2004/0095297 | A1 | 5/2004 | Libsch et al. | 345/76 |
| 2004/0150591 | A1 | 8/2004 | Ozawa et al. | 345/76 |
| 2004/0160394 | A1 | 8/2004 | Irmer et al. | 345/82 |
| 2004/0174349 | A1 | 9/2004 | Libsch et al. | 345/204 |
| 2004/0179005 | A1 | 9/2004 | Jo | 345/211 |
| 2004/0252088 | A1 | 12/2004 | Kawachi et al. | 345/76 |
| 2005/0007361 | A1 | 1/2005 | Fujikura et al. | 345/204 |
| 2005/0030264 | A1 | 2/2005 | Tsuge et al. | 345/76 |
| 2005/0041002 | A1 | 2/2005 | Takahara et al. | 345/76 |
| 2005/0046619 | A1 | 3/2005 | Senda et al. | 345/76 |
| 2005/0067971 | A1 | 3/2005 | Kane | 315/169.3 |
| 2005/0068270 | A1 | 3/2005 | Awakura et al. | 345/76 |
| 2005/0068271 | A1 | 3/2005 | Lo | 345/76 |
| 2005/0104819 | A1 | 5/2005 | Shimoda | 345/76 |
| 2005/0105031 | A1 | 5/2005 | Shih et al. | 349/139 |
| 2005/0110725 | A1 | 5/2005 | Kwak et al. | 345/76 |
| 2005/0140610 | A1 | 6/2005 | Smith et al. | 345/77 |
| 2005/0179399 | A1 | 8/2005 | Leo et al. | 315/169.3 |
| 2005/0200618 | A1 | 9/2005 | Kim et al. | 345/204 |
| 2005/0206591 | A1 | 9/2005 | Wang et al. | 345/76 |
| 2005/0212787 | A1 | 9/2005 | Noguchi et al. | 345/204 |
| 2005/0218791 | A1 | 10/2005 | Kawase | 313/500 |
| 2005/0219163 | A1 | 10/2005 | Smith et al. | 345/76 |
| 2005/0242743 | A1 | 11/2005 | Kwak | 315/160 |
| 2005/0243031 | A1 | 11/2005 | Fish et al. | 345/76 |
| 2005/0243038 | A1 | 11/2005 | Kwak | 345/76 |
| 2005/0243040 | A1 | 11/2005 | Miyazawa | |
| 2005/0264228 | A1 | 12/2005 | Kim | 315/169.3 |
| 2005/0275352 | A1 | 12/2005 | Sun | 315/169.3 |
| 2005/0285822 | A1 | 12/2005 | Reddy et al. | 345/76 |
| 2005/0285827 | A1 | 12/2005 | Eom | 345/76 |
| 2006/0001613 | A1 | 1/2006 | Routley et al. | 345/76 |
| 2006/0044236 | A1 * | 3/2006 | Kim | 345/82 |
| 2006/0077137 | A1 * | 4/2006 | Kwon | 345/76 |
| 2006/0114192 | A1 | 6/2006 | Kasai | |
| 2006/0118700 | A1 * | 6/2006 | Chaussy et al. | 250/214.1 |
| 2007/0132674 | A1 * | 6/2007 | Tsuge | 345/77 |
| 2008/0055223 | A1 | 3/2008 | Stewart | 345/92 |
| 2008/0062090 | A1 | 3/2008 | Stewart | 345/76 |
| 2010/0118018 | A1 | 5/2010 | Stewart | |

OTHER PUBLICATIONS

Office Action Summary from U.S. Appl. No. 11/759,796 mailed on Sep. 17, 2008.

Office Action Summary from U.S. Appl. No. 11/759,806 mailed on Aug. 5, 2008.

Restriction from U.S. Appl. No. 11/759,796 mailed on Apr. 2, 2009.

Final Office Action Summary from U.S. Appl. No. 11/759,806 mailed on May 15, 2009.

Office Action Summary from U.S. Appl. No. 11/759,796 mailed on Jul. 9, 2009.

International Preliminary Report on Patentability mailed Sep. 26, 2008, in PCT Application No. PCT/US2007/013509, filed Jun. 8, 2007, 6 pages.

International Search Report and Written Opinion mailed Jul. 28, 2008, in PCT Application No. PCT/US2007/013509, filed Jun. 8, 2007, 10 pages.

Notice of Allowance mailed Nov. 3, 2009, in U.S. Appl. No. 11/759,796, filed Jun. 7, 2007, 15 pages.

Office Action mailed Aug. 8, 2012, in U.S. Appl. No. 12/692,453, filed Jan. 22, 2010, 20 pages.

Restriction Requirement mailed May 8, 2012, in U.S. Appl. No. 12/692,453. filed Jan. 22, 2012, 8 pages.

Office Action mailed Jan. 16, 2013, in U.S. Appl. No. 12/692,453. filed Jan. 22, 2012, 12 pages.

* cited by examiner

1300

PIXEL CIRCUITS AND METHODS FOR DRIVING PIXELS

RELATED APPLICATIONS

This application claims priority to U.S. Provisional Patent Application Ser. No. 60/805,058, filed Jun. 16, 2006, which is herein incorporated by reference.

FIELD OF THE INVENTION

The present invention relates to graphical display devices, and more particularly, this invention relates to display systems, or components thereof, and methods for driving the same.

BACKGROUND OF THE INVENTION

Graphical display devices are currently used for such things as television screens, computer displays, portable system screens, advertising, information and indication.

One area of interest is that of current-driven displays. Examples of current driven displays include light emitting diodes (LEDs) and organic light emitting diodes (OLEDs).

A great benefit of LED and OLED displays over traditional liquid crystal displays (LCDs) is that LEDs and OLEDs do not require a backlight to function. Thus they draw far less power and, when powered from a battery, can operate longer on the same charge. OLED-based display devices also can be more effectively manufactured than LCDs and plasma displays.

SUMMARY OF THE INVENTION

A display driver according to one embodiment includes a digital to analog converter producing a current at a selected level, an output of the digital to analog converter being coupleable to a data line of a display; and a voltage source being coupleable to the data line for precharging the data line.

In one approach, the digital to analog converter comprises an array of switches coupled to outputs of the demultiplexer, wherein a cumulative output of the switches varies based on which switches are conducting. In another approach, the voltage source includes a voltage regulation feedback loop. In yet another approach, the data line is precharged to below a voltage associated with a black level of the pixels. In a further approach, the data line is precharged to above a voltage associated with a black level of the pixels. In another approach, the data line is precharged to about a voltage needed to supply a current to at least one pixel coupled to the data line. In a further approach, for a given pixel, the data line is precharged to about a voltage applied to that pixel in a previous frame period. In yet another approach, a memory may store a level of the voltage applied to the pixel in a previous frame period. In a still further approach, a second voltage source is coupleable to the data line.

A method for precharging a data line of a display according to another embodiment includes determining a voltage level on a data line during a frame period; storing the voltage level; and prior to or during a subsequent frame period, precharging the data line voltage to a derivative of the stored voltage level.

In one approach, the data line precharge voltage level is adjusted based on a brightness level difference between brightness level data of a previous frame and brightness level data of a current frame of at least one pixel of the current frame. The brightness level data of the previous frame may be stored.

In another approach, the data line is precharged to about a same level as the stored voltage level. In yet another approach, the data line is precharged to slightly less than the stored voltage level. In a further approach, the method is performed for each pixel individually.

A method for precharging a data line of a light emitting current-driven display according to another embodiment includes, between illumination periods, driving each data line in a light emitting current-driven display to a voltage level slightly below a brightness level voltage required at that pixel during a next frame interval.

in one approach, each data line in the light emitting current-driven display is driven to a voltage level slightly below a black level voltage associated with pixels of the display.

A method for precharging a data line of a light emitting current-driven display according to another embodiment includes setting a precharge state of a data line to a darker state than expected for an intended image; and wherein, during non-precharge periods, pixels coupled to the data line always transition from a black towards white.

In one approach, the precharge voltage corresponds to a darker pixel condition than the voltage level on each data line at the end of each line period.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

To place the present description in a context, much of the following description will be presented by way of example in terms of a graphical display. It should be understood, however, that the various embodiments of the present invention are not to be limited to use only with a graphical display, but may be used in electrical circuits for any type of electronic system.

Figure 1:
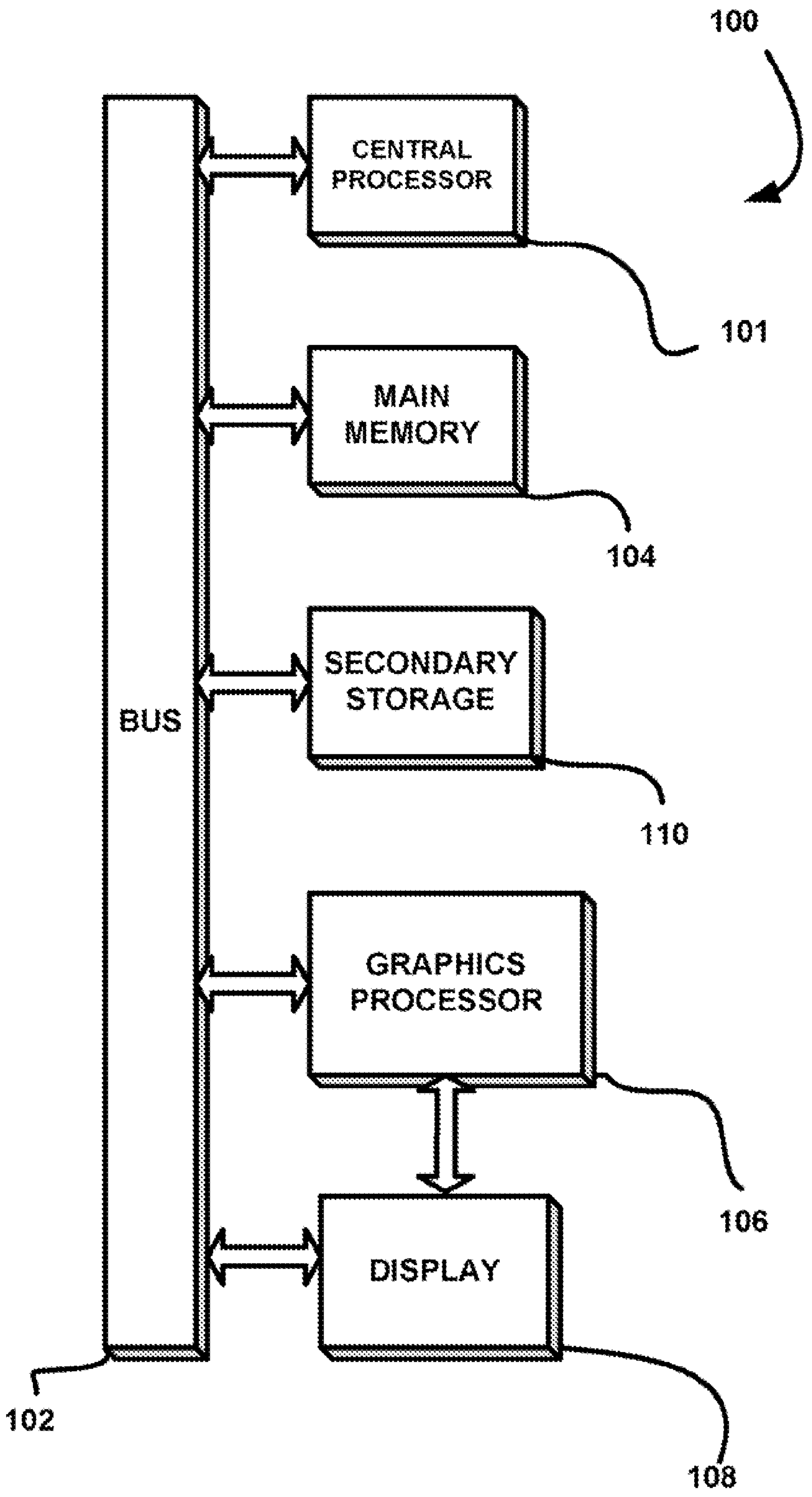
FIG. 1 is a system diagram of an exemplary system in which the various embodiments of the present invention may be implemented.

FIG. 1 illustrates an exemplary system 100 in which the various architecture and/or functionality of the various following embodiments may be implemented. As shown, a system 100 is provided including at least one host processor 101 which is connected to a communication bus 102. The system 100 also includes a main memory 104. Control logic (software) and data are stored in the main memory 104 which may take the form of random access memory (RAM).

The system 100 also includes a graphics processor 106 and a display 108, i.e. a computer monitor. In one embodiment, the graphics processor 106 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 100 may also include a secondary storage 110. The secondary storage 110 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may he stored in the main memory 104 and/or the secondary storage 110. Such computer programs, when executed, enable the system 100 to perform various functions. Memory 104, storage 110 and/or any other storage are possible examples of computer-readable media.

In one embodiment, the architecture and/or functionality of the various previous figures may be implemented in the context of the host processor 101, graphics processor 106, an integrated circuit (not shown) that is capable of at least a portion of the capabilities of both the host processor 101 and the graphics processor 106, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 100 may take the form of a desktop computer, lap-top computer, and/or any other type of logic. Still yet, the system 100 may take the form of various other devices including, but not limited to, a personal digital assistant (PDA) device, a mobile phone device, a television, etc.

Further, while not shown, the system 100 may be coupled to a network [e.g. a telecommunications network; local area network (LAN), wireless network, wide area network (WAN) such as the Internet, peer-to-peer network, cable network, etc.) for communication purposes.

Figure 2:
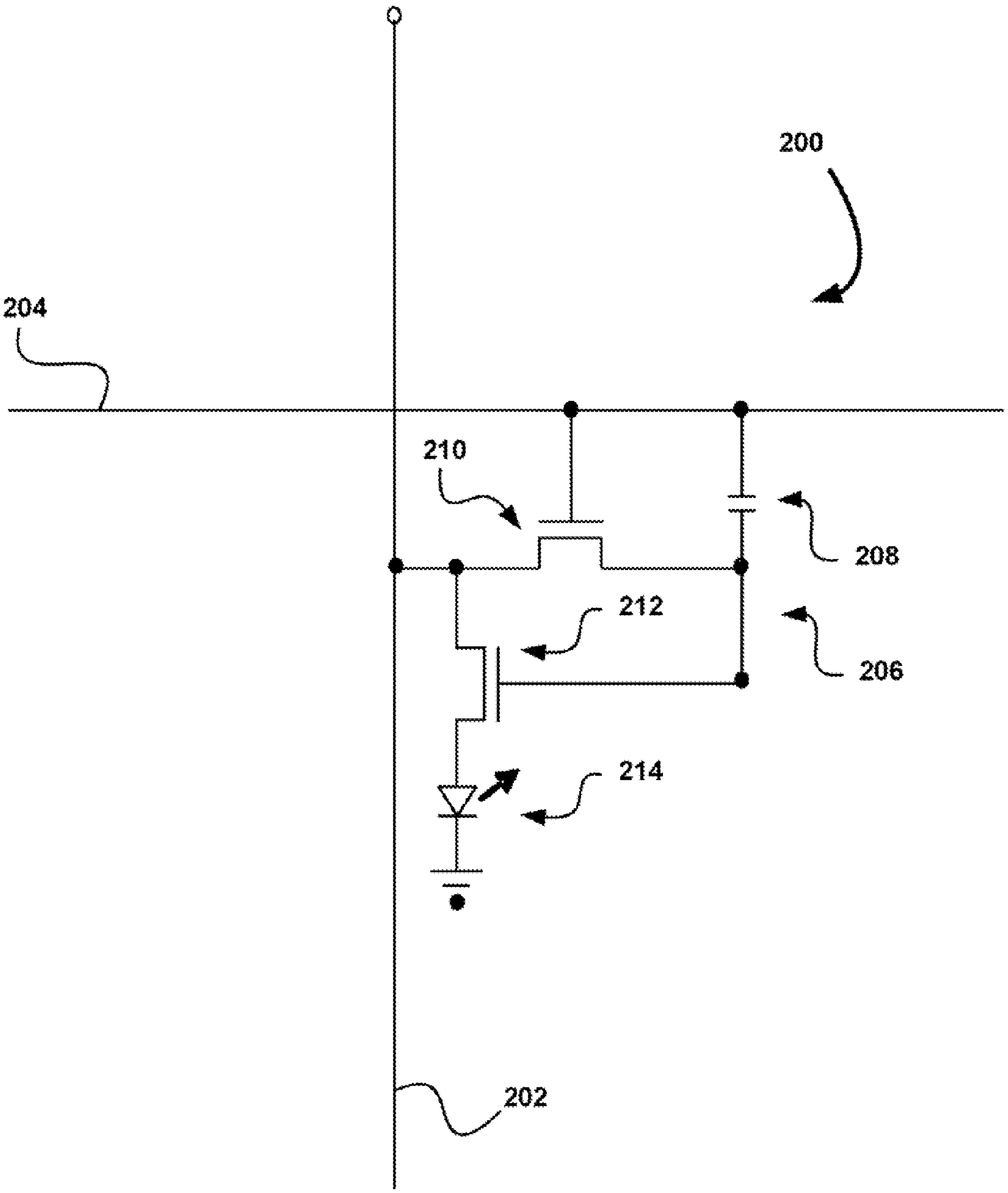
FIG. 2 is a circuit diagram of a current driven pixel circuit for a display, in accordance with one embodiment.

FIG. 2 shows a current driven pixel circuit 200 for a display, in accordance with one embodiment. As an option, the circuit 200 may be implemented in the context of the details of FIG. 1. Of course, however, the circuit 200 may be carried out in any desired environment. Further, the aforementioned definitions may equally apply to the description below.

In the context of the present description, a display refers to an electronic device from which data or images may be viewed. For example, in various embodiments, a display may include, but is not limited to, monitors, laptop displays, PDAs, cellular phone displays, televisions, video gaming displays, and/or any other displays that meets the above definition. Further, such displays may be a liquid crystal display (LCD), plasma display, active-matrix organic light induced diode (AMOLED) display, passive-matrix organic light induced diode PMOLED display, etc.

In one illustrative embodiment, an active-matrix OLED (AMOLED) display includes OLED pixels that have been deposited or integrated onto a thin film transistor (TFT) array to form a matrix of pixels that illuminate light upon electrical activation. The TFT array continuously controls the current that flows to the pixels, signaling to each pixel how brightly to shine. Typically, this continuous current flow is controlled by at least two TFTs at each pixel, one to start and stop the charging of a storage capacitor and the second to provide a voltage source at about the level needed to create a constant current to the pixel. As a result, the AMOLED operates at all times (i.e., for the entire frame scan), avoiding the need for the very high currents required for passive matrix operation.

As shown in circuit 200, a data line 202 is provided, in addition to a select line 204. Such data line 202 is one which a current may be applied by a current source. For example, in one embodiment such source may be a current-mode line driver. Additionally, in the context of the present description, a select line is any line used to select and/or deselect a pixel or plurality of pixels for illumination. In one embodiment, such selection may be initiated by applying a voltage of 10 V to the select line 204, for example. In this case, the application of the 10 V may include the selection of a pixel or a plurality of pixels to illuminate. On the other hand, in one embodiment a voltage of −10 V applied to the select line 204 may signify the deselection of a pixel or plural of pixels.

As further shown in FIG. 2, a storage node 206 is coupled to the select line 204. In addition, a first capacitance 208 coupled between the storage node 206 and the select line 204 is provided. Such first capacitance 208 may take the form of any device capable of storing a charge. In one embodiment, such first capacitance 208 may be a capacitor.

Additionally, a first transistor 210 with a gate is coupled to the select line 204, a first electrode thereof coupled to the storage node 206, and a second electrode thereof coupled to the data line 202. Also present is a second transistor 212 with a gate coupled to the storage node 206, a first electrode thereof coupled to the data line 202.

It should be noted that the first and second transistors 210 and 212 may be any type of structure such as a bipolar junction transistor (BJT), field-effect transistor (FET), such as a junction FET (JFET), and metal-oxide-semiconductor FET (MOSFET) or any other type of transistors. Further, the polarity of the transistors may be any type of polarity such as NPN/PNP BJTs, or N-channel/P-channel FETs, for example.

Furthermore, a light emitting diode (LED) 214 is coupled to a second electrode of the second transistor 212. Although the circuit 200 is described utilizing an LED, in another embodiment an organic LED may similarly be used.

Figure 3:
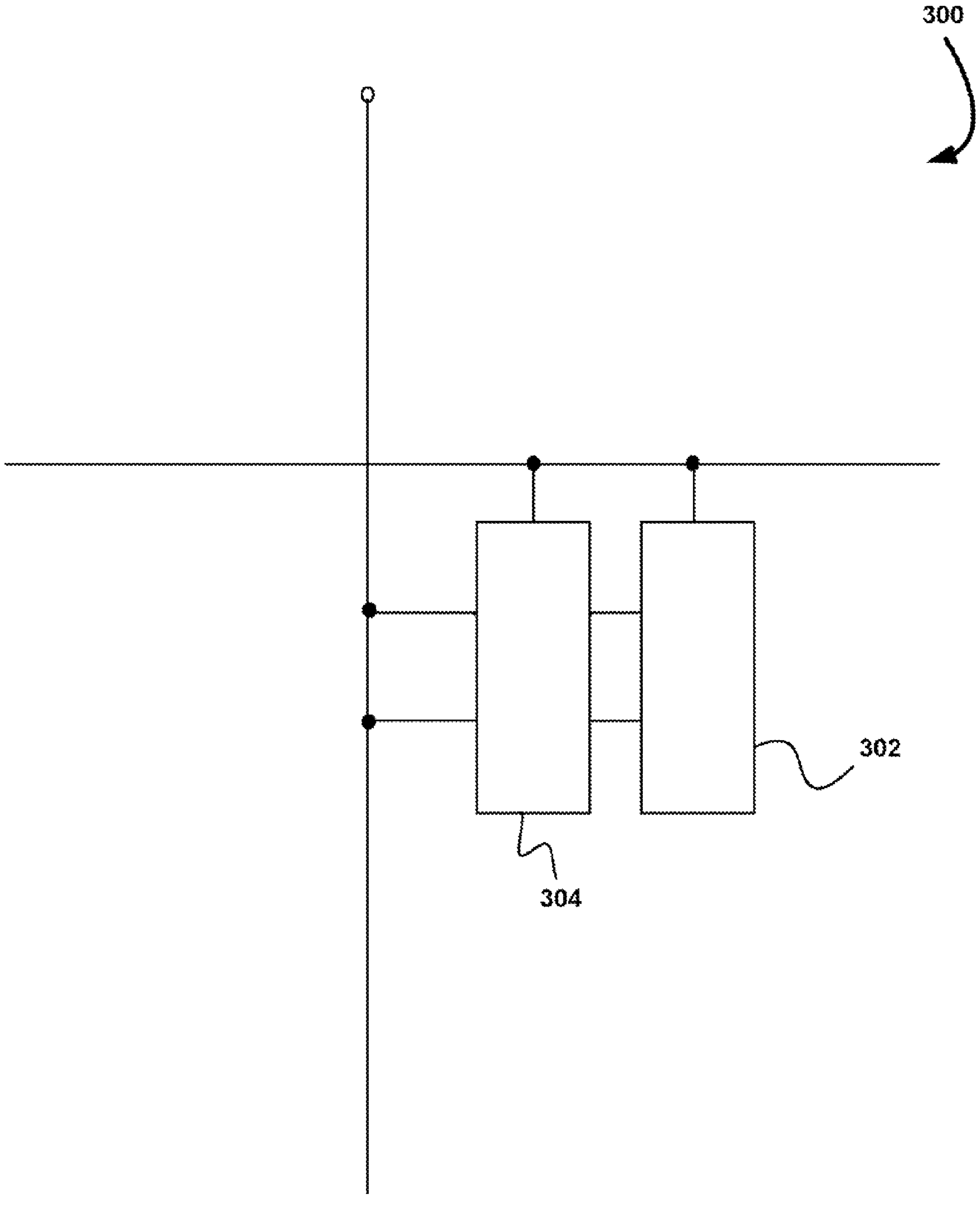
FIG. 3 is a generalized circuit diagram of a sample and hold current device (or sequential current mirror circuit), in accordance with one embodiment.

FIG. 3 shows a sample and hold current device (or sequential current mirror circuit) 300, in accordance with one embodiment. As an option, the sample and hold current device (or sequential current mirror circuit) 300 may be implemented in the context of the details of FIGS. 1-3. Of course, however, the sample and hold current device (or sequential current mirror circuit) 300 may be carried out in any desired environment. Further, the aforementioned definitions may equally apply to the description below.

As shown, circuitry 302 for storing a voltage generated in response to a programming current is provided. In the context of the present description, a programming current may be any level of current capable of being stored. Additionally, circuitry 304 is provided for producing a derivative current responsive to the programming current using the stored voltage, where the derivative current can be higher, lower, equal to 1:1 (programming/mirrored current), and/or be a scaled replica of the programming current. Furthermore, multiple derivative currents may also be generated.

Figure 4:
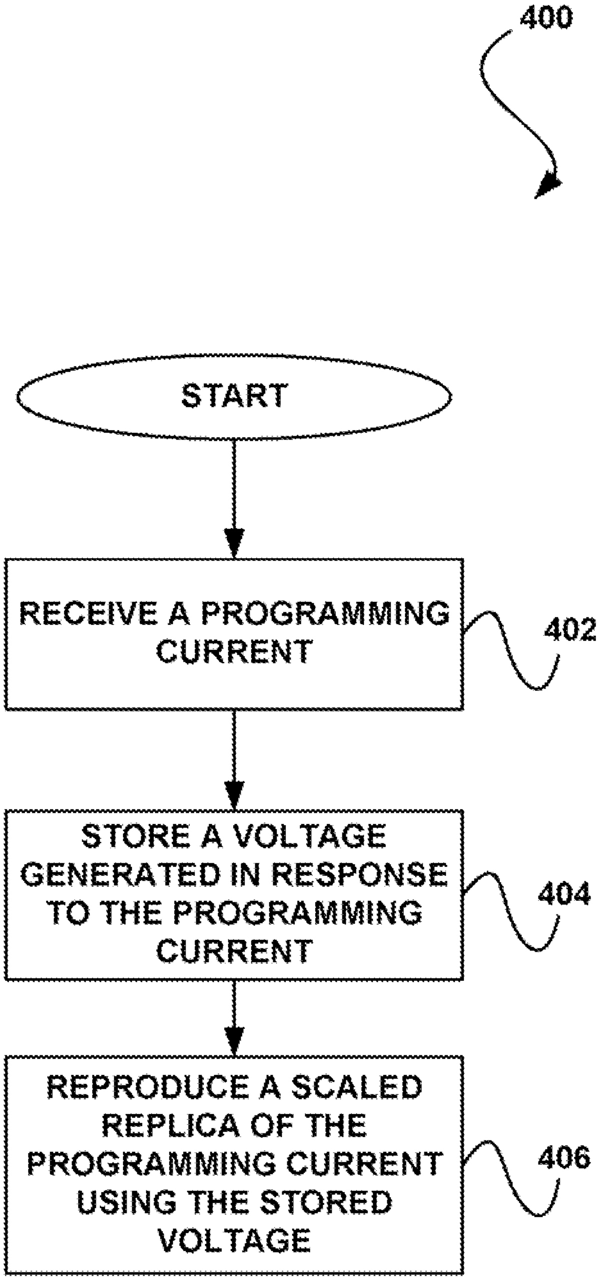
FIG. 4 is a process diagram of a method for generating a scaled replica or a plurality of scaled replicas of a programming current, in accordance with one embodiment.

FIG. 4 shows a method 400 for generating a scaled replica or a plurality of scaled replicas of a programming current where the scaled replica can be higher, lower, or equal to 1:1 (programming/mirrored current), in accordance with one embodiment. As an option, the method 400 may be implemented in the context of the details of FIGS. 1-3. Of course, however, the method 400 may be carried out in any desired environment. Further, the aforementioned definitions may equally apply to the description below.

As shown, in operation 402 a programming current is received. In the context of the present description, a programming current may be any level of current capable of being received. Additionally, in operation 404 a voltage generated in response to the programming current is stored. Such voltage may be stored utilizing a variety of circuitry. In one embodiment, such voltage may be stored in a storage node coupled between two capacitors, for example. Further, in operation 406 a scaled replica of the programming current is produced using the stored voltage. In one embodiment, such scaled replica may be produced utilizing a transistor coupled to a storage node and a data line which provided the programming current, for example.

Figure 5:
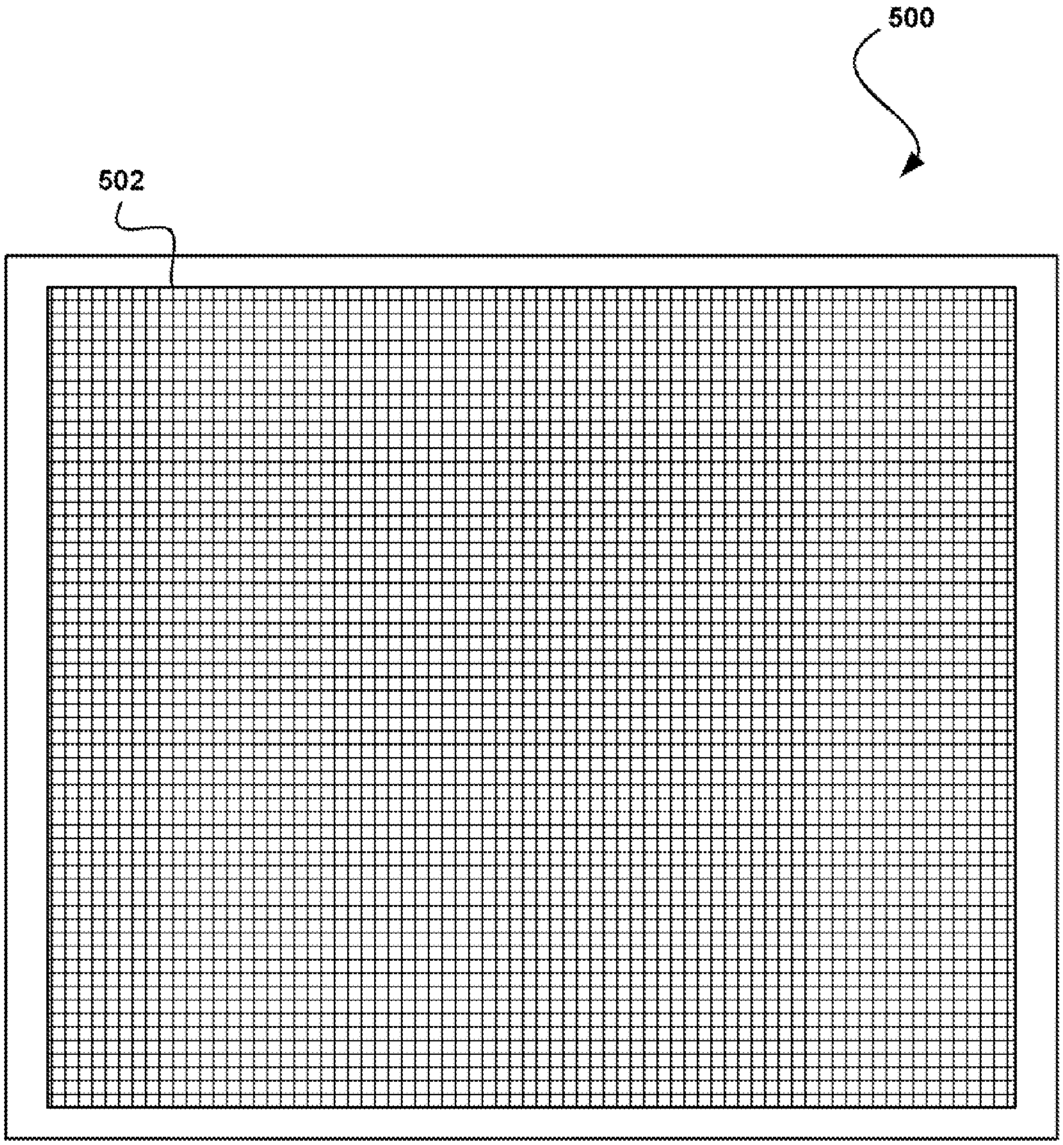
FIG. 5 is a view of a display, in accordance with one embodiment.

FIG. 5 shows a display 500, in accordance with one embodiment. As an option, the display 500 may be implemented in the context of the details of FIGS. 1-4. Of course, however, the display 500 may be carried out in any desired environment. Further, the aforementioned definitions may equally apply to the description below. As shown, a plurality of pixels 502 is provided. In use, the display operates in a load period and an illumination period, where light output by the pixels during the illumination period is a function of voltages stored in the pixels during the load period.

In the context of the present description, a load period is the period of time primarily used to establish a desirable charge in a pixel as defined by a circuit. The illumination period is the period where most of the light is output by the pixels.

In another embodiment, the display 500 may be viewed as a current-driven display. In use, a circuit producing a variable average output current during a frame period in response to a variable average input current received during a line period is provided (e.g. see FIG. 2), where a ratio of high and low values of the output current is different than a ratio of high and low values of the input current.

Figure 6:
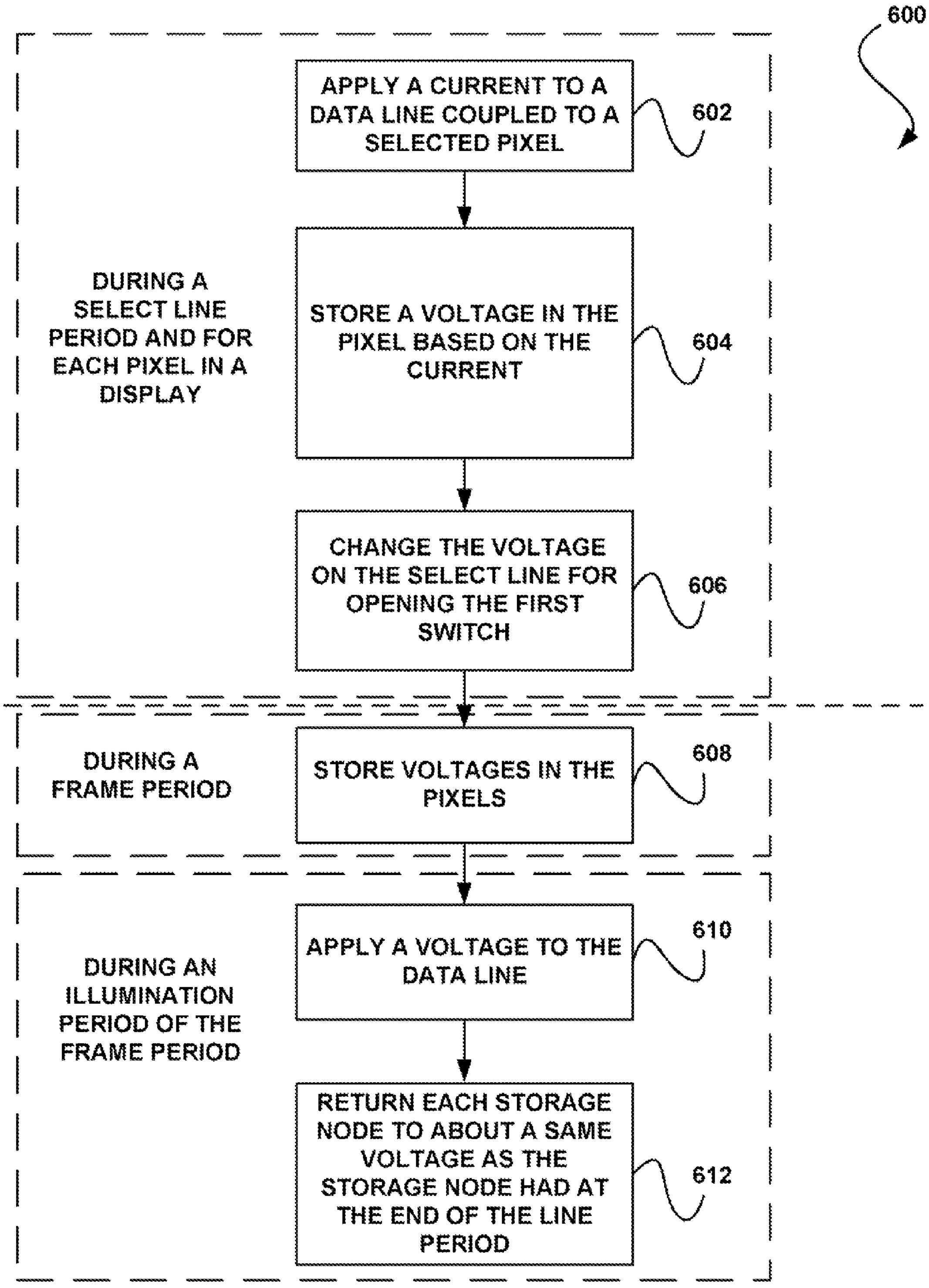
FIG. 6 is a process diagram of a method for illuminating pixels, in accordance with one embodiment.

FIG. 6 shows a method 600 for illuminating pixels, in accordance with one embodiment. As an option, the method 600 may be implemented in the context of the details of FIGS. 1-5. Of course, however, the method 600 may be carried out in any desired environment. Further, the aforementioned definitions may equally apply to the description below.

As shown in operation 602, during a select line period, for each pixel in a display a current is applied to a data line coupled to a selected pixel. In the context of the present description, a data line is a line that is capable of current flow. Additionally, as shown in operation 604, a voltage is stored in the pixel based on the current. Preferably, operation 604 includes manipulating a voltage on a select line coupled to the pixel for closing a first switch between the data line and a storage node, the storage node being coupled to a gate and an electrode of a second switch between the data line and a light emitting diode. In the context of the present description, a select line is any line used to select and/or deselect a pixel or plurality of pixels for illumination. Further, after a period of time, the voltage is changed on the select line for opening the first switch, as shown in operation 606.

Several optional steps may be performed as well. As further shown in operation 608, during a frame period, voltages may be stored in the pixels. Further, during an illumination period of the frame period, a voltage is applied to the data lines, as shown in operation 610. Still yet, in operation 612 each storage node is returned to about a same voltage as the storage node had at an end of the line period, or to a lower voltage than the storage node had at an end of the line period.

Figure 7:
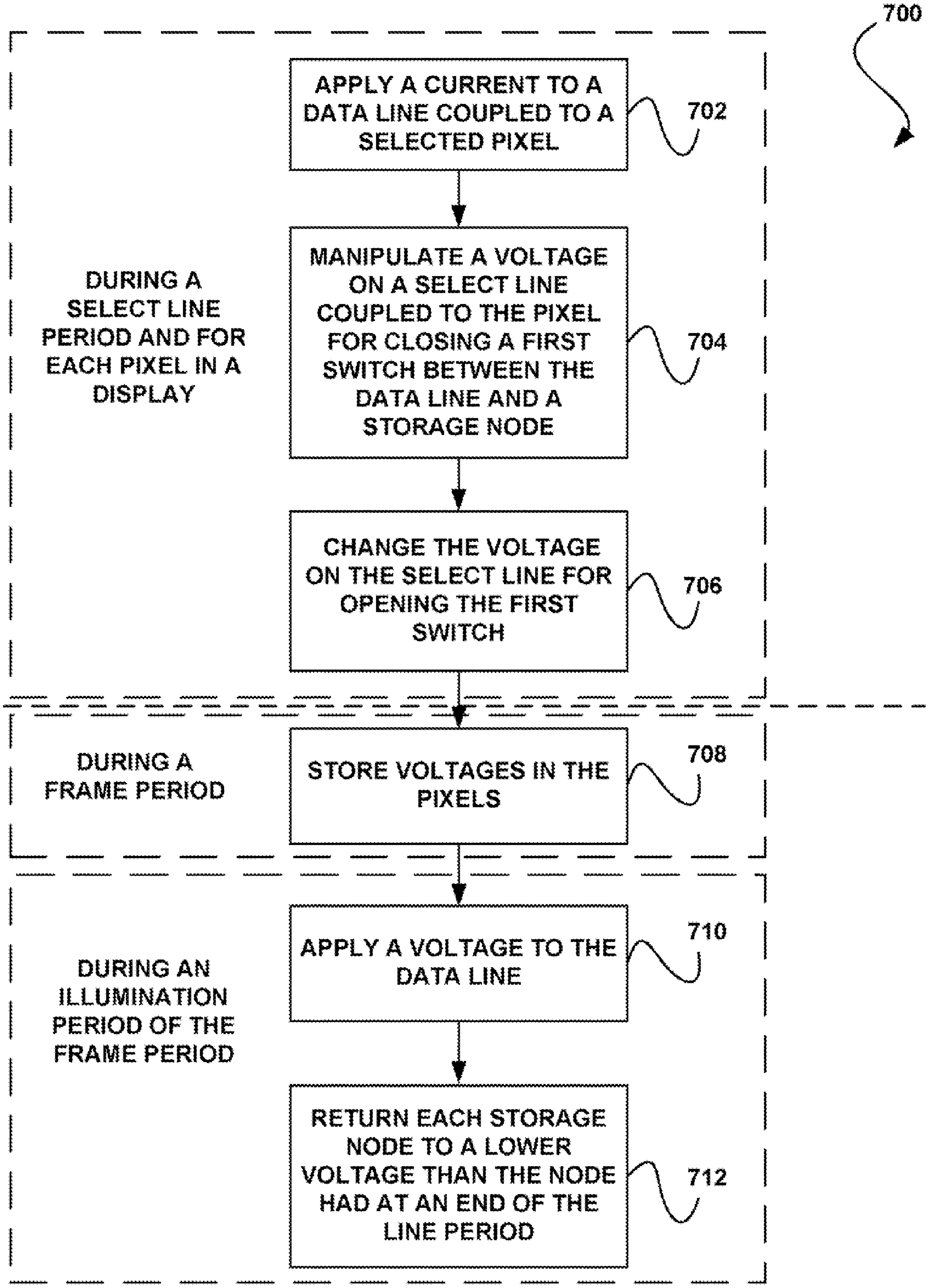
FIG. 7 is a process diagram of a method for illuminating pixels, in accordance with one embodiment.

FIG. 7 shows a method 700 for illuminating pixels, in accordance with another embodiment. As an option, the method 700 may be implemented in the context of the details of FIGS. 1-5. Of course, however, the method 700 may be carried out in any desired environment. Further, the aforementioned definitions may equally apply to the description below.

As shown in operation 702, during a select line period, for each pixel in a display a current is applied to a data line coupled to a selected pixel. In operation 704, a voltage is manipulated on a select line coupled to the pixel for closing a first switch between the data line and a storage node, the storage node being coupled to a gate and an electrode of a second switch between the data line and a light emitting diode. Additionally, after a period of time, the voltage is changed on the select line for opening the first switch, as shown in operation 706.

Several optional steps may be performed as well. As further shown in operation 708, during a frame period, voltages are stored in the pixels. Further, as shown in operation 710, during an illumination period of the frame period, a voltage is applied to the data lines. In operation 712, each storage node is returned to a lower voltage than the storage node had at an end of the line period.

Figure 8:
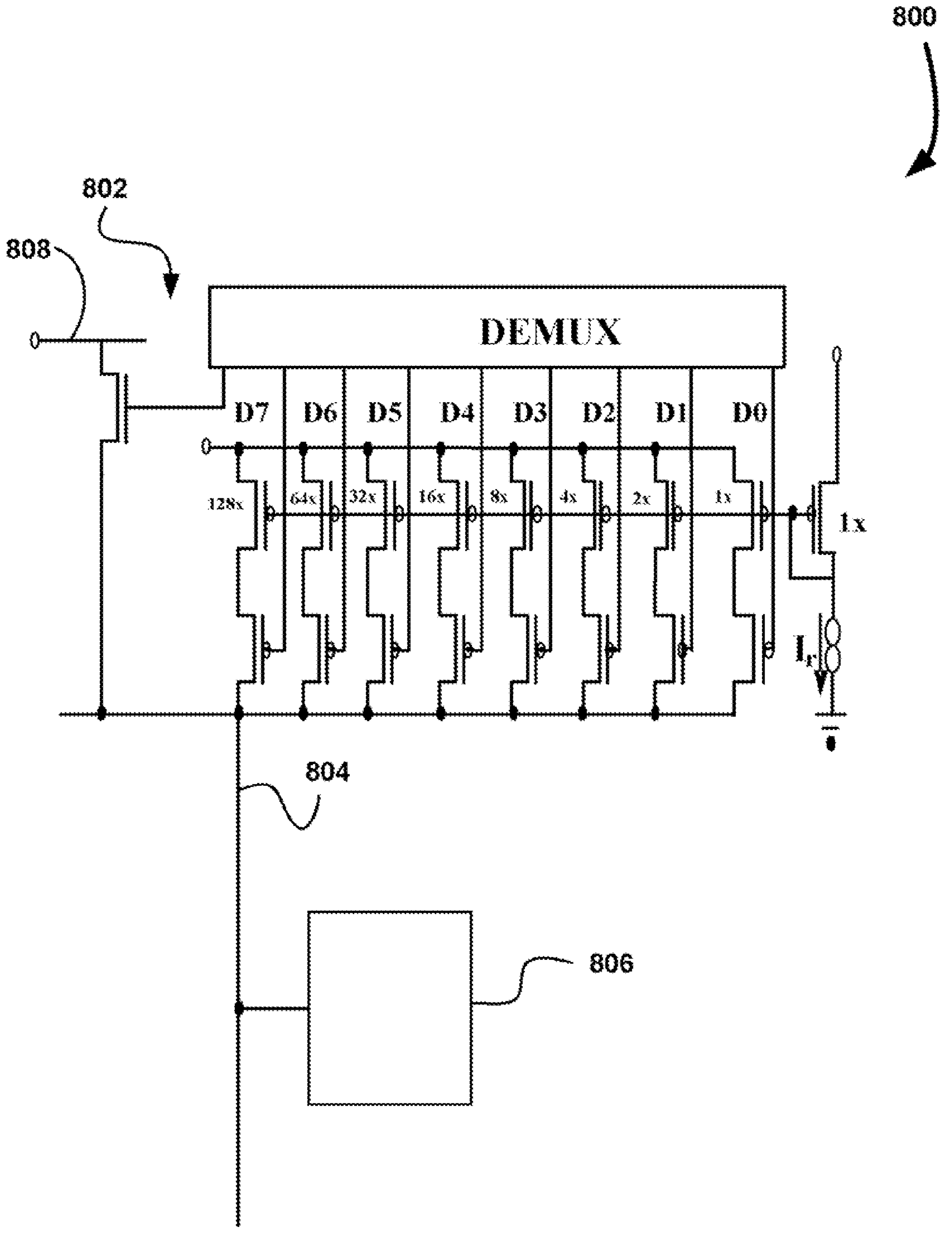
FIG. 8 is a circuit diagram of a display driver, in accordance with another embodiment.

FIG. 8 shows a display driver 800, in accordance with another embodiment. As an option, the display driver 800 may be implemented in the context of the details of FIGS. 1-7. Of course, however, the display driver 800 may be carried out in any desired environment. Further, the aforementioned definitions may equally apply to the description below.

As shown, a digital to analog converter 802 producing a current at a selected level, an output of the digital to analog converter 802 being coupleable to a data line 804 of a display 806. Further, a second voltage source 808 may be coupled to the data line 804 for precharging the data line 804.

Figure 9:
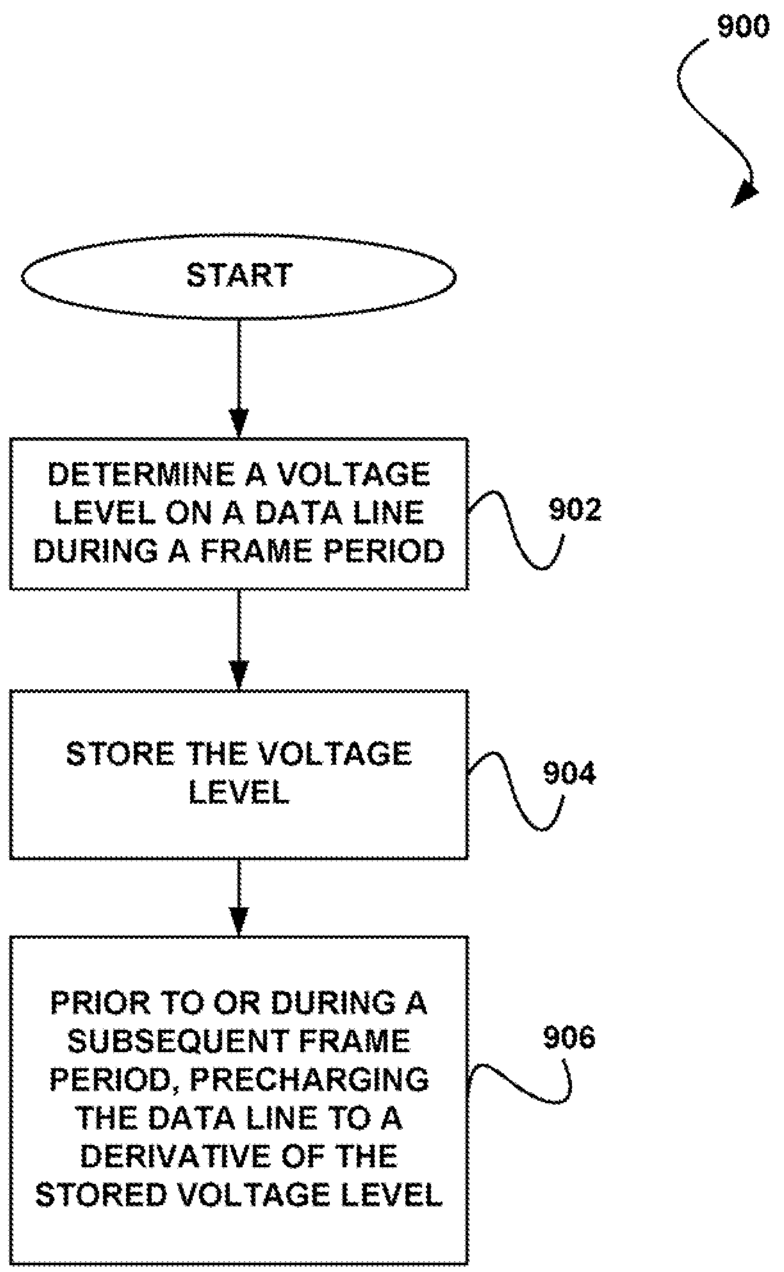
FIG. 9 is a process diagram of a method for precharging a data line of a display, in accordance with one embodiment.

FIG. 9 shows a method 900 for precharging a data line of a display, in accordance with another embodiment. As an option, the method 900 may be implemented in the context of the details of FIGS. 1-8. Of course, however, the method 900 may be carried out in any desired environment. Further, the aforementioned definitions may equally apply to the description below.

As shown in operation 902, a voltage level on every data line is determined at the end of each select line period within a frame period. In operation 904, these voltage levels are stored in a frame store memory. Further, prior to or during a subsequent frame period, each data line is precharged to a derivative of the stored voltage level for that select line period, as shown in operation 906.

Figure 10:
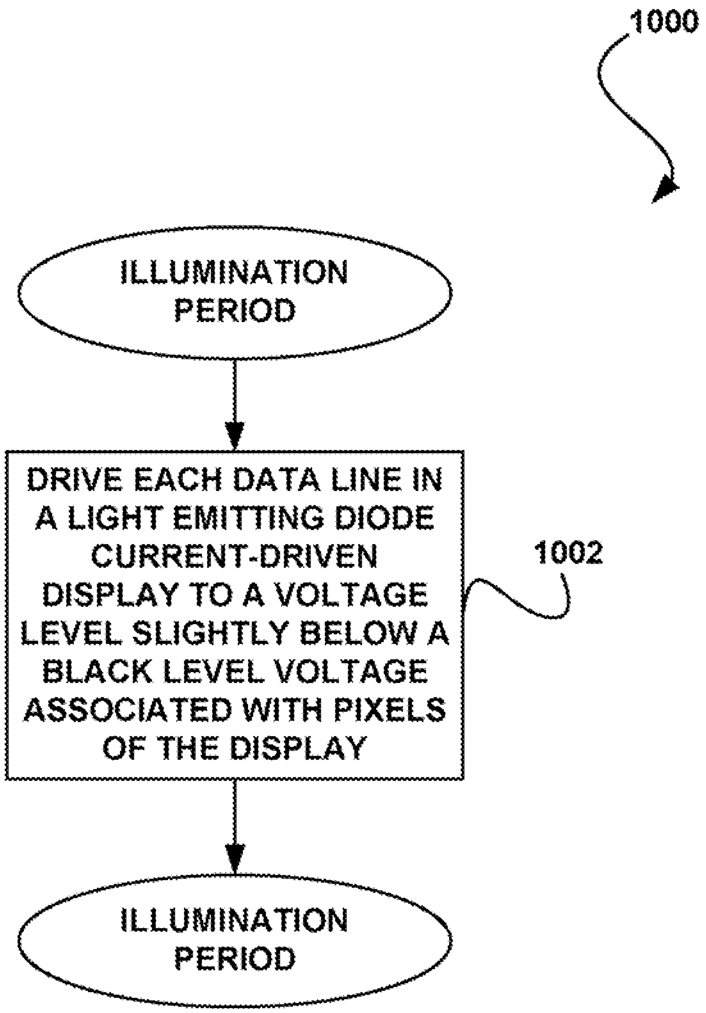
FIG. 10 is a process diagram of a method for precharging a data line of a light emitting diode current-driven display, in accordance with one embodiment.

FIG. 10 shows a method 1000 for precharging a data line of a light emitting diode current-driven display, in accordance with one embodiment. As an option, the method 1000 may be implemented in the context of the details of FIGS. 1-9. Of course, however, the method 1000 may be carried out in any desired environment. Further, the aforementioned definitions may equally apply to the description below.

In one embodiment, as shown in operation 1002, between illumination periods each data line may be driven to a voltage level slightly below a black level voltage associated with the pixels of the display.

Figure 11:
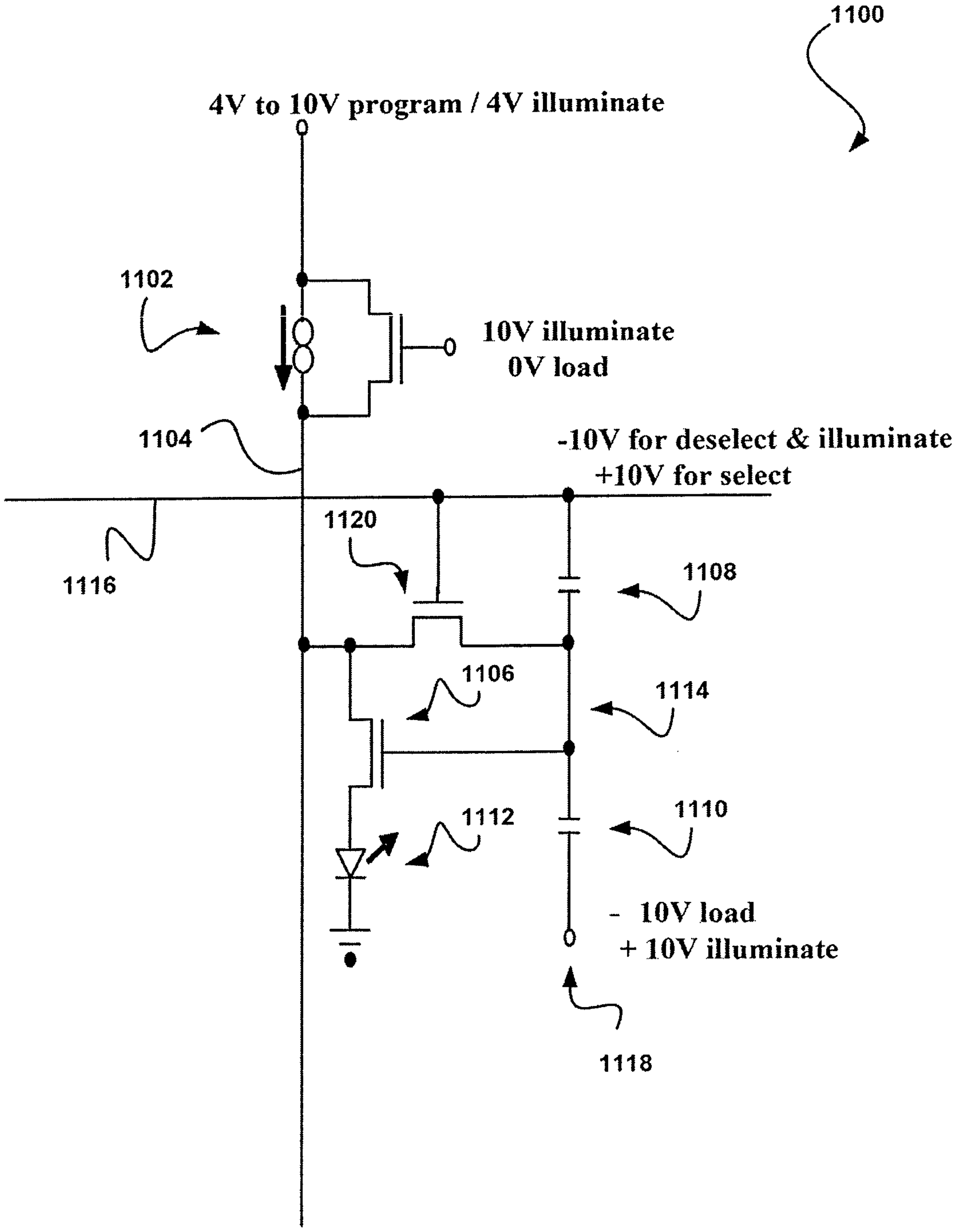
FIG. 11 is a circuit diagram of a circuit for a 2-transistor Sequential Current Mirror (SCM) AMOLED pixel, in accordance with one embodiment.

FIG. 11 shows a circuit 1100 for a 2-transistor Sequential Current Mirror (SCM) AMOLED pixel, in accordance with one embodiment. Portions or ail of the circuit 1100 may be reproduced for each pixel in a given display. As an option, the circuit 1100 may be implemented in the context of the details of FIG. 1-10. Of course, however, the circuit 1100 may be carried out in any desired environment. Further, the aforementioned definitions may equally apply to the description below.

As shown in circuit 1100, a data line 1104 is provided, in addition to a select line 1116. Further, a storage node 1114 is coupled to the select line 1116. In addition, a first capacitance 1108 coupled between the storage node 1114 and the select line 1116 is provided.

Additionally, a first transistor 1120 with a gate is coupled to the select line 1116, a first electrode thereof coupled to the storage node 1114, and a second electrode thereof coupled to the data line 1104. Still yet, a second transistor 1106 with a gate coupled to the storage node 1114, a first electrode thereof coupled to the data line 1104.

Furthermore, an organic light emitting diode (OLED) 1112 is coupled to a second electrode of the second transistor 1106. Although the circuit 1100 is described utilizing an OLED, in another embodiment a LED or other current-driven pixel may similarly be used.

In another preferred embodiment, the fastest operation is achieved by precharging each data line and pixel close to—but slightly to the dark side—of its "predicted settling voltage". The "predicted settling voltage" for each pixel is computed as the voltage on that data line and pixel at the end of its select line period during the previous frame, with a correction voltage to account for brightness differences (if any) between the brightness data that was to have been displayed during the previous frame and the brightness data that is to be displayed during the current frame. The calculation of this correction voltage is done with a lookup table that is responsive to both the previous frame data and current frame data for that pixel.

Best operation is usually achieved by further adjusting the actual precharge voltage to a level about 0.1V different from the "predicted settling voltage" such that the pixel conducts slightly less current immediately after the precharge than it would if it were precharged exactly to its "predicted settling voltage." This way, each pixel usually transitions from a darker state towards lighter state during the current-mode interval which follows the precharge interval during the select line time. Any excess charge on the data line is thereby rapidly removed by the precharge instead of having to discharge slowly through the pixel itself.

The operating principles behind at least some of the embodiments of the pixel described herein are based on "current mirror circuit design". In a classical current mirror circuit, the gate voltage on transistor 1106 would then be connected directly to the gate of a second "mirrored" "output" transistor, which causes the mirror output transistor (also operating in its "saturation mode") to sink almost exactly the same current through it's drain connection As long as transistor 1106 and its mirror transistor have the same threshold voltage, mobility, etc., a properly designed current mirror is well known as one of the best ways to protect circuits from the variations in temperature, process parameters, etc. that otherwise afflict IC designers.

As shown, a reference or "programming" current may be applied to the data line 1104 and forced to flow through the second transistor 1106 which has its gate and drain nodes connected together.

However, in the sequential current mirror design shown in FIG. 11, transistor 1106 has no physical mirror transistor. Instead, as shown, the gate voltage of the second transistor 1106, developed in response to the programming current, is first stored on the first capacitor 1108 and a second capacitor 1110 (shown as part of the storage node 1114), and then used later to drive a mirror version of that same current through the OLED 1112.

In one embodiment, the second transistor 1106 may be viewed as its own "mirrored output" transistor, as the second transistor 1106 is used for both a reference transistor and an output transistor. Using the same transistor sequentially as both the reference transistor and the output transistor, allows for the second transistor 1106 to be a perfect mirror match to itself. This results in a simple but elegant sample-and-hold circuit that first "samples" the program current, and then produces a scaled replica of that current during an extended "illumination" period.

It should be noted that the circuit 1100 is extremely accurate and uniform due to the current programming that compensates for variations and drift in the transistor threshold. The circuit 1100 also effectively compensates for transistor threshold and mobility variations, and non-uniformities and drift in OLED offset voltages.

It should further be noted that, although the circuit 1100 is shown for NMOS transistors driving the anode of the OLED with a common cathode, in another embodiment the circuit may be varied to drive the OLED cathode. In other embodiments, PMOS and CMOS transistors may also be used in independently or in conjunction with NMOS transistors.

Further, in one embodiment, the first capacitor 1108 and the second capacitor 1110 may be sized by deliberate layout choices to control the natural parasitic capacitances that are an intrinsic part of the transistors themselves. In another embodiment, the first capacitor 1108 and the second capacitor 1110 may be added during pixel layout.

In yet other embodiments, the circuit 1100 may be designed such that the capacitance of the first capacitor 1108 and the capacitance of the second capacitor 1110 are equal. Further, for operation in High-Speed Mode, the first capacitor 1108 may be made about 20% larger than the second capacitor 1110. Such High-Speed Operation of Current-Mode Pixels is described in more detail below.

For illustrative purposes, the circuit 1100 will be used to describe possible operation of the circuit with the first capacitor 1108 equal to the second capacitor 1110 and no other significant capacitance loading the storage node 1114. In this example, it will be shown how the circuit 1100 receives, stores, and provides the current necessary to display a bright gray-scale level (8 μA) and a moderately-dark gray-scale level (0.016 μA) with a contrast ratio of 500:1.

As described, the voltage at the storage node 1114 normally ranges from a 1V black level to 4V maximum white level referenced to a state where all other nodes connected to the circuit were grounded. In another embodiment, the pixel voltage at the storage node 1114 may be referenced to another condition.

At the start of a load select line period, a current-mode data line driver 1102 begins injecting 8 RA onto the data line 1104 and the select line 1116 that has been selected is raised to 10V. It should be noted that, initially, a common node 1118 is held constant at −10V. Once the first transistor 1120 begins to conduct, the storage node 1114 is directly connected to the data line 1104. Since a selected row of pixels all have +10V on their select lines (e.g. the select line 1116) and −10V on their load terminals (e.g. the common node 1118), their storage nodes (e.g. the storage node 1114) will be at their referenced condition (e.g. IV to 4V). However, all pixels connected to deselected lines will have negative voltages on the storage node 1114 according the calculation: Va=Vstored+C1/(C 1+C2)*Vselect+C2/(C1+C2)*Vcommon=(+1 to +4V) −5V −5V=(−9V to −6V); where Vstored is the voltage at the storage node 1114, C1 and C2 are the capacitances of the first capacitor 1108 and the second capacitor 1110, respectively, Vselect is the voltage of the select line 1116, and Vcommon is the voltage at the common node 1118.

Thus, the second transistor 1106 has negative voltage on its gate and is therefore non-conducting for all the deselected pixels. The 8 pA current from the current-mode data line driver 1102 therefore must all flow through the second transistors 1106 in the selected pixels. It should be noted that the select line 1116 voltage for the deselected pixels must be even more negative than the lowest voltage stored on the storage node 1114 to insure that the first transistor 1120 is also always turned off for the deselected pixels.

During the select period, the voltage on the storage node 1114 will either rise or fall to the exact voltage level to permit the second transistor 1106 to conduct the 8 ttA current. For example, if the voltage on the storage node 1114 is initially too low to†permit the second transistor 1106 to conduct, less than 8 pA will flow through the second transistor 1106 and some of the excess current from the data line 1104 will then flow through the first transistor 1120 into the storage node 1114 to raise the voltage at the storage node 1114.

Conversely, if the voltage on the storage node 1114 is initially too high causing the second transistor 1106 to conduct too much current, then the current flowing through the second transistor 1106 will be more than 8 μA and the excess current flowing through the second transistor 1106 will pull current back through both the second transistor 1106 and the first transistor 1120 until the voltage on the storage node 1114 reaches the right value. This operation therefore incorporates nearly perfect compensation for the variations in the forward drop of the OLED 1112, the threshold voltage of the second transistor 1106, the mobility of the second transistor 1106, and power supply variations—all are reflected in and corrected for by the voltage at the storage node 1114 at the end of the select period.

Alternatively, when loading a darker gray-scale level into the circuit (i.e. pixel or array of pixels), the current-mode data line driver 1102 injects only 0.016 μA onto the data line 1104. As before, the voltage on the storage node 1114 will either rise or fall to the exact voltage level to permit the second transistor 1106 to conduct the 0.016 μA current. For example, if the voltage on the storage node 1114 is initially lower than it should be, less than 0.016 μA will flow through the second transistor 1106 and some of the excess current from the data line 1104 will then flow through the first transistor 1120 into the storage node 1114 to raise the voltage of the storage node 1114. Conversely, if the initial voltage on the storage node 1114 is higher than it should be, then the current flowing through the second transistor 1106 will be more than 0.016 μA and the excess current flowing through the second transistor 1106 will pull current back through both the second transistor 1106 and the first transistor 1120 until the voltage on the storage node 1114 reaches the right value. Therefore the voltage stored at the storage node 1114 at the end of the line period is just sufficient to drive 0.016 μA through the second transistor 1106 and the OLED 1112 and thereby compensates for the variations in the forward drop of the OLED 1112, the threshold voltage of the second transistor 1106, power supply variations, and the mobility of the second transistor 1106.

At the end of the select period, the select line 1116 is returned to its deselected −10V level which turns off the first transistor 1120 and locks and stores the correct voltage at the storage node 1114. Deselecting this pixel or array of pixels (e.g. a row of pixels) also drives the voltage at the storage node 1114 negative to terminate any flow of current through the second transistor 1106.

During a frame period, each row of pixels is alternately selected and deselected in sequence and the proper voltages stored in their respective pixels. Only minimal light is generated during this frame period.

The frame period also includes an illumination period. In this example, the illumination period is 20% of the frame period, the equivalent of 256 line periods out of 1280 (1024+256) total line periods. This illumination period may be divided into 16 sub-periods of 16 line periods each wherein an illumination sub-period is inserted after each block of 64 line load periods. However, preferably the entire 256 line illumination period would be inserted after scanning through all select lines to significantly reduce the kinds of motion artifacts that are normally associated with other conventional sample-and-hold displays like AMOLEDs and AMLCDs.

During the illumination period the data line 1104 is first raised and clamped hard to +4V and then the common line 1118 is raised to +10V. During the illumination period the voltage on the storage node 1114 for every pixel in the array is thereby capacitively restored to roughly the same voltage as had been present at the end of its respective selection line period. Therefore, during the illumination period each pixel may simultaneously conduct the same current as it was conducting at the end of its line period. Thus, in the current embodiment, an active matrix display may be 256 times brighter than a simple line-at-a-time display wherein each pixel only produces light during one line period instead of 256 line periods.

In various embodiments, the voltage levels may be adjusted as necessary to achieve either higher brightness or higher power efficiency. For example, if more voltage is desired to drive the OLED 1112, the data line 1104 voltage level could be raised to 10V in order to store a wider range of voltages in the circuit 1100 (1-10V). Furthermore, during the illuminate period, the data line 1104 could be clamped either higher or lower than this 4V level.

In another embodiment, higher power efficiency may be achieved (e.g. with a small compromise to mobility compensation in the brightest pixels) by programming all pixels at 10V, but providing about 4V during the illumination period. The second transistor 1106 may now operate in the more power efficient "bootstrapped" or "triode" mode for the brightest pixels to provide extremely power-efficient operation in the array. It should be noted that when the display is operating at maximum brightness over 99% of the light is generated during the illumination period—while less than 1% is generated during the load and programming periods. Therefore, providing a higher voltage during the load and programming periods does not significantly affect the operating power efficiency of the display. Although the overall gamma characteristic would be slightly flattened by operating the second transistor 1106 in the triode mode, this effect can be easily corrected by the gamma correction circuit mentioned in the disclosure.

While the SCM array could be operated exclusively in the saturation mode to provide the best uniformity and accuracy, in most applications we will be able to reduce the illumination voltage to its lowest possible voltage to maximize power efficiency, and let the second transistor 1106 drop into its triode region without significantly degrading the image quality of the display. Even in its triode region the pixel continues to provide excellent cancellation for the OLED 1112 offset voltage variations and resistance, variability in TFT Vt, and the power supply variations. Only its compensation for TFT mobility would be significantly reduced and these mobility variations aren't usually the biggest source of gray scale variations anyway. And even under these conditions the second transistor 1106 would continue to operate in its saturation mode for all of the gray scale levels below that of the brightest pixels. So while the pixel compensation is best at higher data line voltages, this pixel still provides excellent compensation and uniformity even when operating in a low-data-line-voltage ultra-high-efficiency mode.

It should also be noted that that the voltage loss in the pixel is minimized by using only one transistor between the power supply and the OLED 1112 compared with other OLED pixels which require the OLED 1112 current to pass through two transistors connected in series.

High-Speed Operation of Current-Driven Pixels:

While the nominal design described above provides excellent compensation for transistor and other variations with a simple 2Q SCM pixel, the following technique may be used to reduce the delays associated with charging and discharging the data line with current sources.

One of the key issues with any current-driven pixel is dealing with the long and variable time-constants that may occur on the data line. For example, in a 17V, SXGA active matrix OLED array with 1024 horizontal lines of resolution, 1280×3 data lines, a maximum brightness of 150 foot-lamberts, an average OLED efficiency of 10 mA/cm at 100 fl, and a contrast ratio of 500:1, the total average illumination current in the array at maximum brightness is about 6 A, and the average illumination current during the illumination period is 30 A. In the nominal design described above the maximum current on each data line would be about 8 μA. The time needed to charge or discharge a data line capacitance of typically 40 pf over a voltage range of 5V in this example is:

$$t=\Delta V*C/I=5*40\times10^{-12}/8\times10^{-6}=25\ \mu s$$

which is a problem since it is larger than a line period of typically 16 μs. However, like other current-driven active-matrix pixels, the dark gray-scale level transient response will be even slower than the brighter pixels. In our example with a contrast ratio of 500:1, the dark pixels conduct only 16 nA and the settling time on the data line is much slower:

$$t=\Delta V*C/I=5*40\times10^{-12}/0.016\times10^{-6}=12{,}000\ \mu s$$

The data line time constant for this dark gray-scale pixel is now 700 times longer than the entire select line period and at least 200 times longer than would be tolerable in a practical array.

Accordingly, the following description describes two additional innovations to solve this key problem:

(1) Modifying the capacitor values in the pixel to cause the pixel to transition gradually from line mode of operation to a frame mode of operation as the brightness increases from minimum to maximum. This also greatly improves the accuracy and uniformity of the display gray scale levels especially in the low-brightness areas of the screen.

(2) Adding a voltage precharge circuit to the data decoder to reduce settling time on the data lines.

In this example, to operate the pixel in high-speed mode, the pixel is adjusted so that the voltage stored at storage node 1114 during the illumination period is slightly less (in this example by 1V) than what was stored during the line mode. This can be easily be achieved by making capacitor 1108 20% larger than capacitor 1110. It can also be achieved by simply lowering the voltage on the common node slightly during the illuminate period from +10V to approximately +6V.

Figure 12:
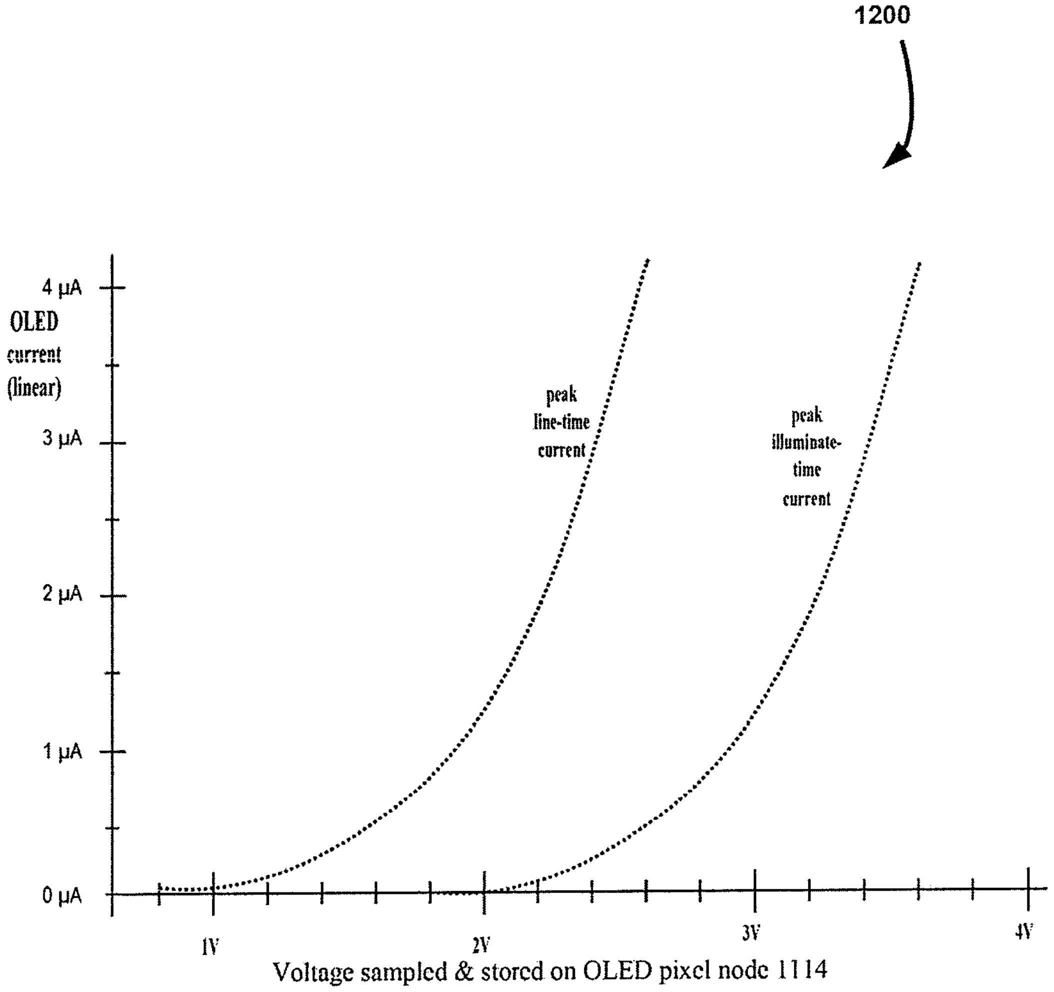
FIG. 12 is a chart depicting currents flowing through an OLED during a line period and an illuminate period, in accordance with one embodiment.

The currents flowing through transistor 1106 and the OLED during both the line period and illuminate periods are then as shown in the chart 1200 of FIG. 12. In this case, the OLED currents are plotted as a linear function of the stored voltage at storage node 1114 during the selected line period. In this example the TFT transistors each have a threshold of Vt=1.0V, and a sub-threshold slope of about 200 mV/decade. As expected the current is negligible at the threshold voltage (IV) and increases above that roughly proportionally to $I\sim(Va-Vt)^2$. The peak current flowing during the selected line period is shown. Because the voltage on storage node 1114 has now been adjusted to be 1.0 V lower during the illuminate period than during the selected line period, the plot of peak illuminate-period current looks the same as the plot of peak line-time current except that it has now been shifted to the right by exactly I V. Note that the peak line-time pixel current is always larger than the peak illuminate-period pixel current.

However, to properly explain how a 2Q pixel in one embodiment works in its high-speed mode, the following description will show how both the peak and average line-time and illuminate-period currents are related and may be combined.

Figure 13:
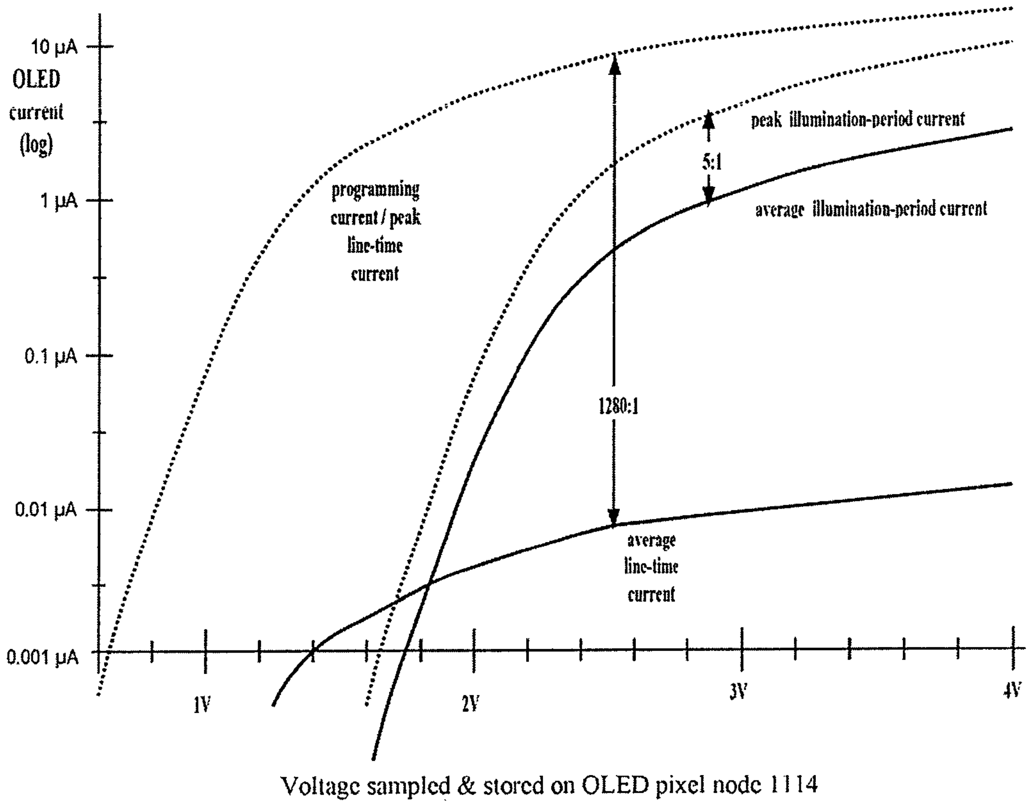
FIG. 13 is a chart of the data from FIG. 12, on a semi-log scale.

Reference is made to FIG. 13, which is a chart 1300 of the data from FIG. 12, on a semi-log scale. Note that the square-law variation of current vs. voltage that looks steep in FIG. 12, does not look nearly as steep in the semi-log plot 1300 in FIG. 13. The semi-log plot 1300 in FIG. 13 also shows other important effects that were hidden in FIG. 12 including the sub-threshold currents flowing during both the line-select period and the illuminate periods. FIG. 13 also shows the time-averaged line-time and illumination-period currents. Since the line-time current only flows for 1 line period out of 1280 line periods in the frame the average line-time current is quite low. However since the illumination-period current flows for 256 out of the 1280 total line periods, the average illumination period current is 20% as high as the peak illumination period current. Note that when the pixel voltage exceeds 1.8V, the average illumination period current is now much larger than the average line-time current.

Figure 14:
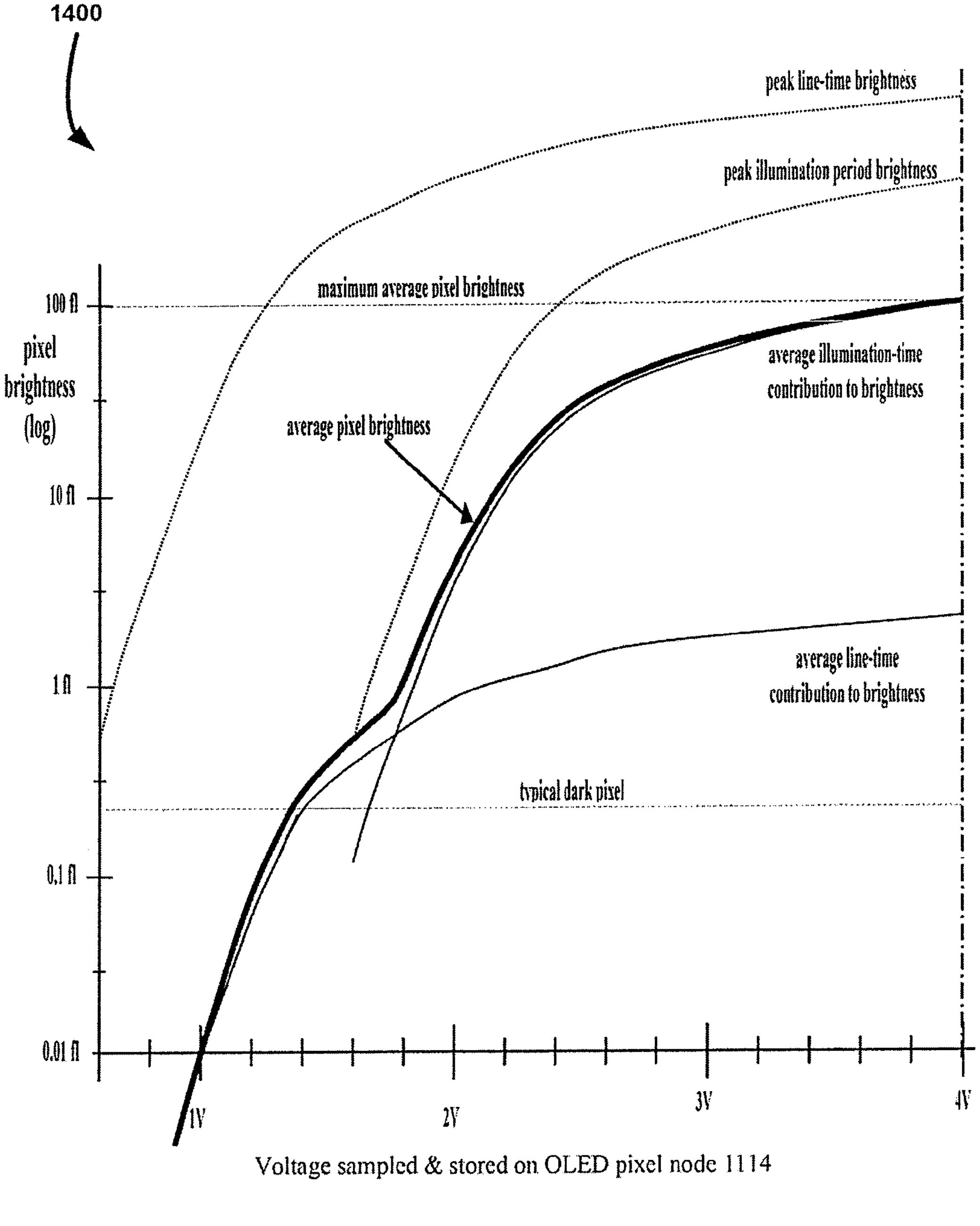
FIG. 14 is a chart of pixel brightness as a function of the voltage stored at a storage node at the end of a select period, in accordance with one embodiment.

Next we plot and compare the contributions of both the average line time current and the average illumination period current to the pixel brightness in the display. Since the time-averaged brightness of an OLED pixel is roughly proportional to time-averaged current flowing through it. FIG. 14 is a plot 1400 of the pixel brightness in foot lamberts as a function of the voltage stored at storage node 1114 at the end of the select period.

Note that with pixel voltages below 1V no significant currents flow through the pixel during the selected line time, the de-selected line time, or the illumination period, and the pixel therefore emits no light at all. Therefore this design can support pixel contrast ratios of 10,000:1 or even higher and the contrast ratio is limited only by the room's ambient illumination. Between 1V and 1.6V the contribution to pixel brightness from the illumination-period current is negligible and most of the brightness results from the time-average peak brightness flowing during the brief select line time. Between voltage levels of 1.6V and 2.0V, both the select-period line-time current and sub-threshold current flowing during the illumination period contribute significantly to overall pixel brightness. However, once the pixel's stored voltage increases above 2V, and the voltage on transistor 1106 rises well above its threshold voltage during the illuminate period, the brightness contribution of the illumination period quickly dominates—despite its lower peak value—because the illumination period is 256 times longer than the line time. In this example, the peak brightness level of 100 fl is achieved with 4V stored at storage node 1114.

While unusual, the gamma curve for the pixel shown in FIG. 14 is a good match to the human visual system and is easily mapped into the gamma 2.3 curve commonly used in photography and TV.

Figure 15:
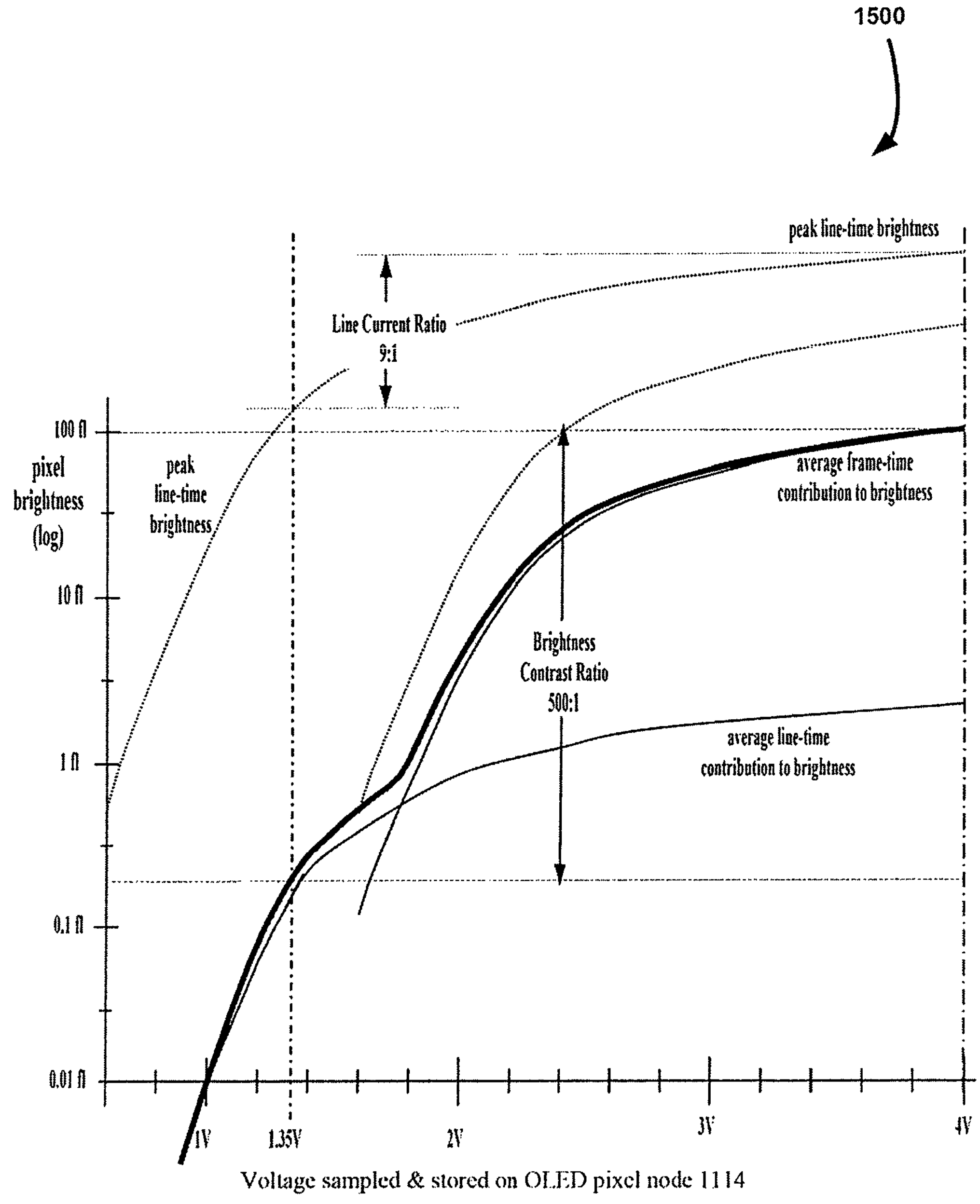
FIG. 15 is a chart depicting a line current ratio and a contrast ratio, in accordance with one embodiment.

FIG. 15 is a chart 1500 showing how this unbalanced SCM pixel design solves the speed problem afflicting both the nominal 2Q design and all of the other current-driven displays.

First note that the maximum peak current flowing during the select line period is now slightly higher since the illumination period peak current is only about half of the line time peak programming current such that the illumination-average-current is now less than 256 times as high as the average-line-current. The peak line current may then be slightly increased by the ratio:

$$I_{peak\ line}=I_{nominal}(V_a-V_t)^2/(V_a-V_t-1\text{V})^2=8\mu A(4\text{V}-1\text{V})^2/(4\text{V}-2\text{V})^2=20\mu\text{A}$$

The data line delay is now:

$$t=\Delta V^*C/I=5^*40\times10^{-12}/20\times10^{-6}=10\ \mu\text{s}$$

which is a little faster but not greatly different from the 25 μs delay achieved above. However the line delay for the dark pixel has been improved dramatically. From FIG. 15, the peak line current corresponding to the 1.35V level that is stored in the pixel to provide the 0.2 fl pixel brightness for a contract ratio of 500:1, corresponds to 11% of the current required to provide the 100 fl brightness described above.

The data line delay for the dark pixel is now:

$$t=\Delta V^*C/I=5^*40\times10^{-12}/2.2\times10^{-6}=90\ \mu\text{s}$$

Compared with the 12,000 μs delay suffered in the nominal pixel, this higher-speed design is more than 100 times faster and is now adequate for many display applications. Also as long as pixels of different colors are not connected to the same data line (as is usually the case), then even without a line precharge, data line delays of several times the line time may be tolerated without creating significant visually-perceptual degradation of the image. Using the advanced adaptive precharge circuit shown in the "High Speed Data Line Drivers with Voltage Precharge" section below, ΔV can be reduced to about 0.1V which further reduces the data line delay to only 1.8 μs even for the worst case dark pixels. The 1.8 μs delay is now fast enough for all display applications.

In summary, the new high-speed pixel in this exemplary embodiment achieves a brightness ratio of 500:1 with a line current ratio of only 9:1. Even extreme contrast ratios of 5,000:1 are achieved with a line current ratio of only 30:1. This unexpected result is achieved because the display and pixel operates at lower voltages in a line-illumination mode where it works like a passive matrix OLED display, then gradually transitions above 2V to operate in a frame-illumination mode like a traditional Active Matrix OLED which multiplies its brightness by more than 100 times. The illumination-period-to-line-period-ratio (256×) effectively multiplies and extends the current ratio on the data line (9×) to produce high-contrast displays without creating large and variable delays in charging and discharging the data lines. A fundamental problem limiting the deployment of current-driven OLED pixels has now been solved.

As a side benefit, the new gamma curve shown in FIG. 15 provides much more accurate control of dark pixels compared to a conventional square-law display pixel where a fixed change in the voltage stored in the pixel produces a much bigger percentage change in dark pixels than it does in the bright pixels. The new gamma curve shown in FIG. 15 yields a steeper-than-square-law relationship between the pixel voltage and brightness, which corresponds better to the way the eye perceives light. Control of dark pixels is therefore roughly 10 times as accurate as using a conventional pure square-law pixel.

Figure 16:
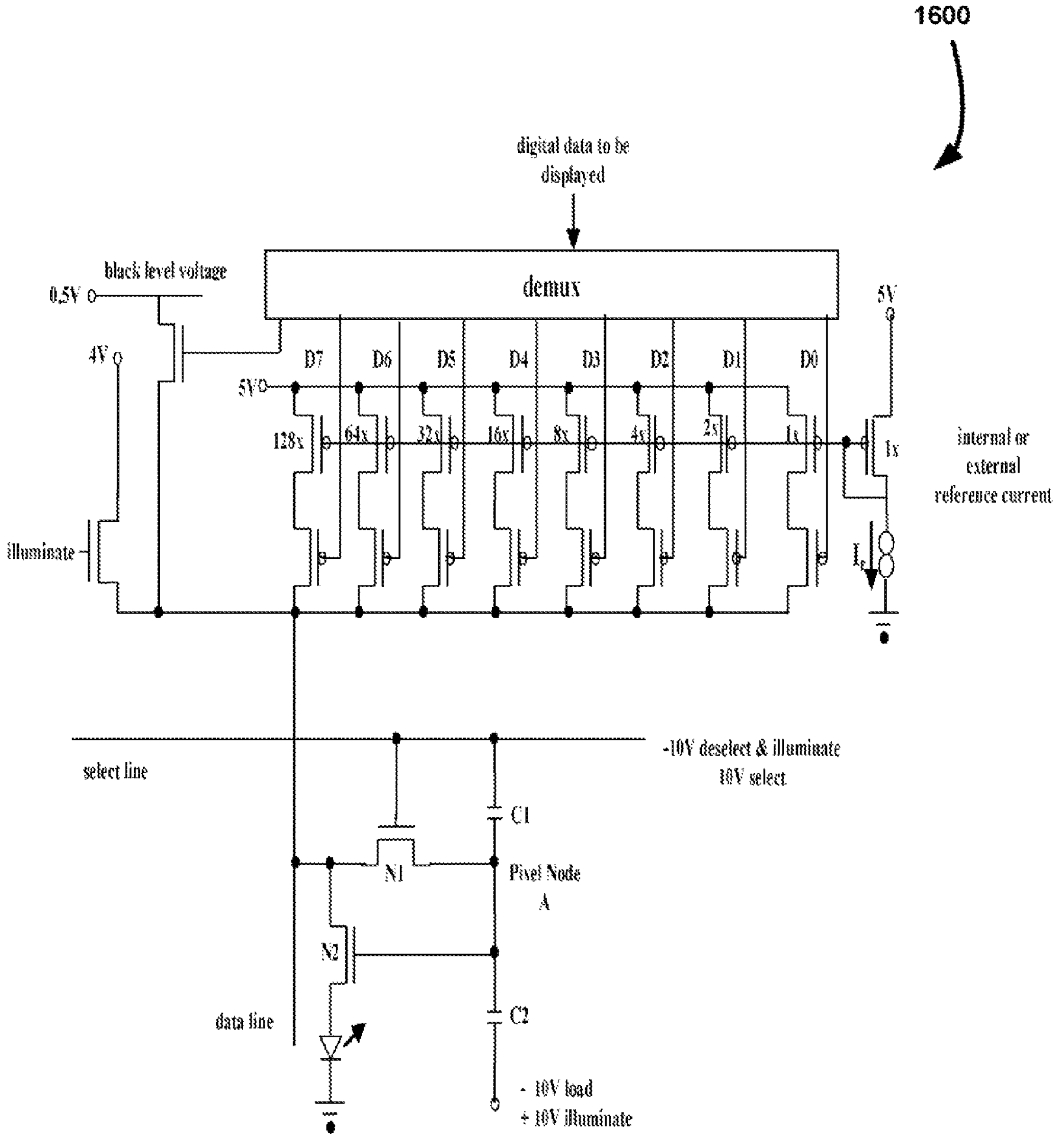
FIG. 16 is a circuit diagram of a current-mode line data line driver, in accordance with one embodiment.

High-Speed Data Line Drivers with Voltage Precharge:

FIG. 16 provides details on the design of a simple current-mode data line driver 1600 that can be used to drive the SCM pixel. A digital industry-standard demultiplexer is used to load and store the digital information to be displayed during one line time. The 8 binary outputs switch various combinations of 8 p-type transistors in or out of the circuit. Each of these 8 transistors is twice as big and conducts exactly twice as much current as the one immediately to the right of it. This array injects any one of 256 different current levels onto the data line.

The use of a current mirror configuration controls all of these binary-weighted current segments as a fixed precise fraction of the internal or external reference current $I_r$ shown in FIG. 16. Since as discussed the previous section, the currents required are not large—typically in the range from 1-20 μA—no amplifier is needed between the D/A matrix and the data line.

A good uniform black level is insured by precharging (at the beginning of every line period) every data line to a voltage level slightly below the black level voltage for node-A in the pixels Though not always necessary for the fast SCM pixel described above, the charge and discharge of the data lines of current-mode displays can be made faster by combining use of the current driver described in FIG. 16 with the analog voltage driver shown in FIG. 17 to create the circuit 1700 shown. At the beginning of the line period, the analog voltage driver pre-charges each data line to approximately the voltage needed to supply the desired current to each pixel.

This "precharge voltage" is calculated by first measuring and storing in a frame store memory the voltage level that had been present on that data line at the end of the line period for that same pixel during the previous frame period. This "frame store" voltage level is then adjusted for any brightness level differences at this pixel between the brightness-level data provided during the last frame and the brightness-level data provided during the current frame based on a simple fixed lookup table. This adaptive, iterative, and accurate method generates a different precharge level for each pixel. In this way the system accurately and adaptively predicts the required voltage and will quickly precharge that data line close to—and preferably slightly below—this level at the beginning of its line period.

This analog voltage precharge is typically completed within 2 μs after which the data line driver reverts to its current drive mode to permit the current and voltage levels to settle out to their final values.

This requires a frame store memory of both the prior data line voltage (to within 10 mV) and the previous pixel brightness level. This adaptive frame-store-based precharge circuit and method described herein will be accurate to better than 0.5V even for a rapidly changing image, reducing the slew voltage from 5V to 0.5V and reducing the data line delay by a factor of 10:1. After a few frame periods for the static or slowly moving images, this adaptive precharge circuit can reduce the residual precharge error to less than 0.1V—which in this example will reduce the data-line settling time to only 1.8 μs.

Figure 17:
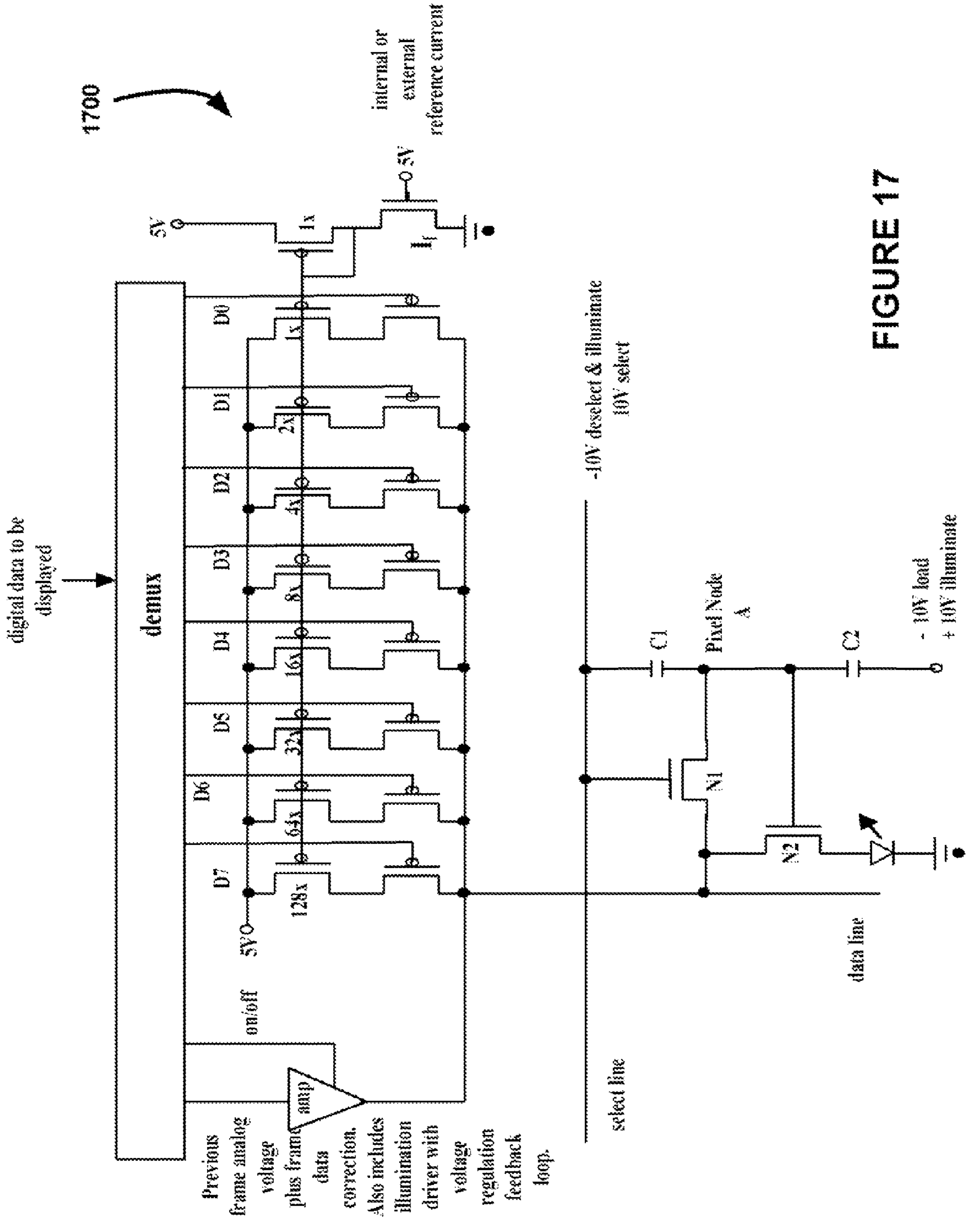
FIG. 17 is a circuit diagram of a current-mode line data line driver, in accordance with one embodiment.
Figure 1:
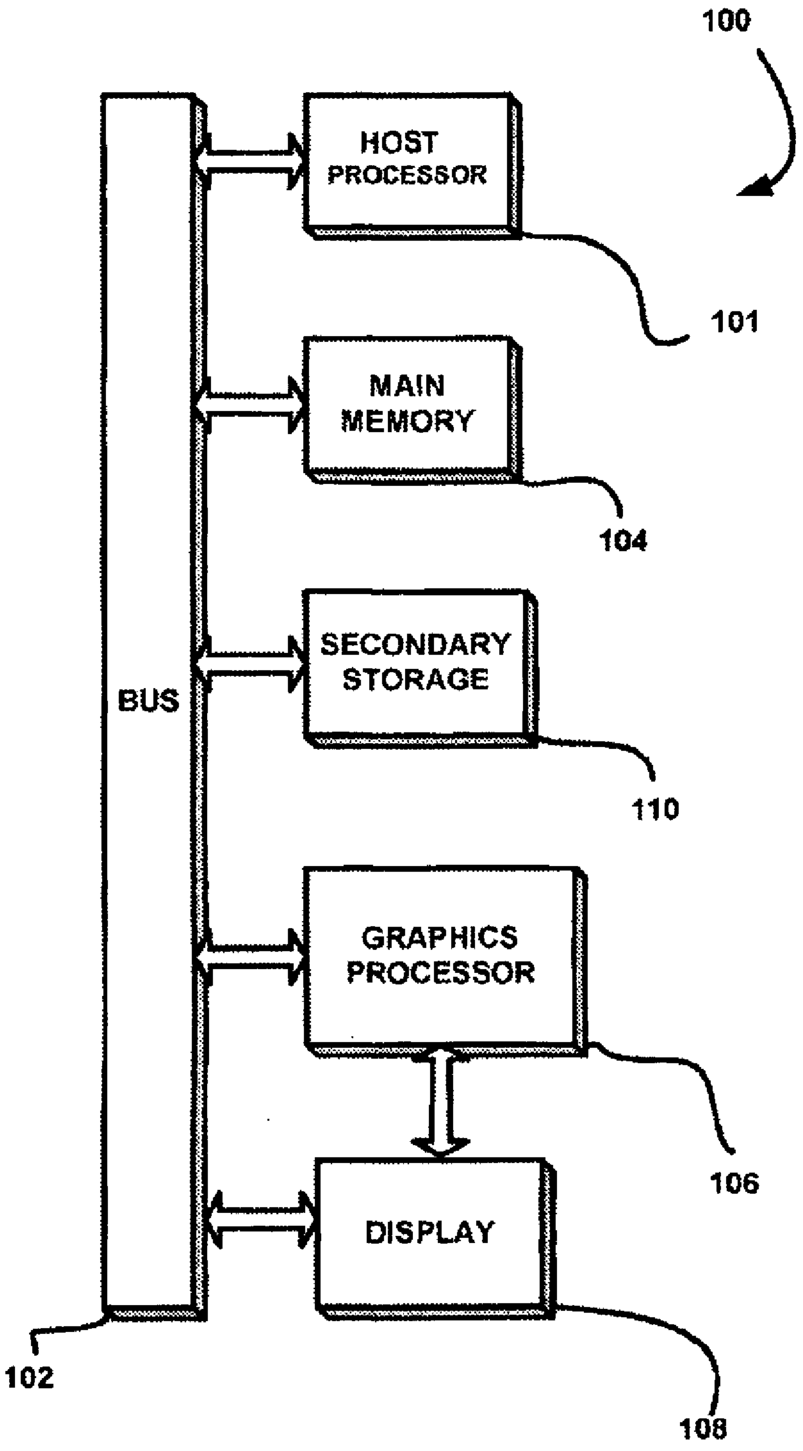

Both the circuits shown in FIGS. 16 and 17 are adjusted to precharge the data lines slightly below the final voltage. This biases the pixel to transition through a slightly darker state during steady-state or light-to-dark-state transitions. This in turn provides cleaner black levels and a better dynamic response than the opposite condition wherein the pixel might otherwise transition through a brighter state during steady-state or light-to-dark-state transitions.

During the illuminate period all of the data lines are clamped hard to a fixed power supply such that the voltage on each data line is held to the 4V level with an accuracy of about 2 mV independently of whether the current flowing in that particular data line is near its maximum 8 mA level or near zero. In this example, as many as 4 million pixels may conduct simultaneously during the illuminate period and draw a maximum display current of up to 30 amperes. In some cases to achieve this level of control, each data line driver (or cluster of data line drivers) may require a negative voltage feedback circuit similar to voltage regulation circuits used in design of regulated power supplies.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A display driver, comprising:

a digital to analog converter configured to produce a current at a selected level, an output of the digital to analog converter being coupleable to a data line of a display;

a voltage source being coupleable to the data line and configured to precharge the data line; and a memory configured to store a level of the voltage applied to a pixel coupled to the data line in a previous frame period, wherein the voltage source is further configured to precharge the data line to a derivative of the stored voltage level prior to or during a subsequent frame period relative to the previous frame period.

2. A display driver as recited in claim 1, wherein the digital to analog converter comprises an array of switches coupled to outputs of a demultiplexer, wherein a cumulative output of the switches on the data line varies based on which switches are conducting.

3. A display driver as recited in claim 1, wherein the voltage source includes a voltage regulation feedback loop.

4. A display driver as recited in claim 1, wherein the data line is precharged to below a voltage level corresponding to a black level of the pixels.

5. A display driver as recited in claim 1, wherein the data line is precharged to above a voltage level corresponding to a black level of the pixels.

6. A display driver as recited in claim 1, wherein the data line is precharged to about a voltage needed to supply a current to at least one pixel coupled to the data line prior to the current from the digital to analog converter being applied to the data line.

7. A display driver as recited in claim 1, wherein, for a given pixel, the data line is precharged to about a voltage applied to that pixel in a previous frame period.

8. A display driver as recited in claim 1, further comprising a second voltage source being coupleable to the data line.

9. For a plurality of pixels of a display, a method for precharging a data line of the display, the method comprising:

for each pixel, determining a voltage level on the data line coupled to the pixel during a previous frame period;

storing the voltage level; and prior to or during a subsequent frame period relative to the previous frame period, precharging the data line voltage to a derivative of the stored voltage level.

10. A method as recited in claim 9, further comprising adjusting the data line precharge voltage level based on a brightness level difference between brightness-level data of a previous frame and brightness-level data of a current frame of at least one pixel of the current frame.

11. A method as recited in claim 10, further comprising storing the brightness-level data of the previous frame.

12. A method as recited in claim 9, wherein the data line is precharged to about a same level as the stored voltage level, and further comprising after the precharging, applying a current to the data line to program pixels coupled to the data line.

13. A method as recited in claim 9, wherein the data line is precharged to slightly less than the stored voltage level, and further comprising after the precharging, applying a current to the data line to program pixels coupled to the data line.

14. A method as recited in claim 9, wherein the method is performed for each pixel in the display.

15. A method for precharging a data line of a light emitting current-driven display, comprising:

using display data derived from a previous frame for precharging each data line in the light emitting current-driven display to a voltage level corresponding to a brightness level that is less than a brightness level required at a selected pixel coupled to the data line during a next frame interval.

16. A method as recited in claim 15, wherein each data line in the light emitting current-driven display is driven to a voltage level corresponding to a brightness level that is slightly less than a black level associated with pixels of the display.

17. A method as recited in claim 15, wherein the precharge voltage for each pixel is calculated by storing in a frame store memory brightness-level data during the previous frame period; and adjusting the precharge voltage for any brightness level differences at each pixel between brightness-level data provided during a last frame interval and brightness-level data provided during a current frame interval based on a look-up table.

18. A method as recited in claim 15, wherein the brightness level is slightly less than the brightness level required at the selected pixel.

* * * * *

UNITED STATES PATENT AND TRADEMARK OFFICE

CERTIFICATE OF CORRECTION

PATENT NO. : 8,446,394 B2
APPLICATION NO. : 11/759817
DATED : May 21, 2013
INVENTOR(S) : Stewart It is certified that error appears in the above-identified patent and that said Letters Patent is hereby corrected as shown below:

On the Title Page, Item (57), under "ABSTRACT", in Column 2, Line 3, delete "level" and insert -- level, --, therefor.

On Title Page 2, Item (56), under "OTHER PUBLICATIONS", in Column 2, Line 21, delete "12/692,453." and insert -- 12/692,453, --, therefor.

On Title Page 2, Item (56), under "OTHER PUBLICATIONS", in Column 2, Line 22, delete "12/692,453." and insert -- 12/692,453, --, therefor.

In the Drawings

On the drawing sheet, consisting of Fig. 1, should be deleted to be replaced with the drawing sheet, consisting of Fig. 1, as shown on the attached page.

In the Specification

In Column 2, Line 13, delete "in one" and insert -- In one --, therefor.

In Column 3, Line 60, delete "may he" and insert -- may be --, therefor.

In Column 4, Line 37, delete "PMOLED" and insert -- (PMOLED) --, therefor.

In Column 8, Line 26, delete "connection" and insert -- connection. --, therefor.

In Column 9, Line 47, delete "8 pA" and insert -- 8 μA --, therefor.

In Column 9, Line 56, delete "8 ttA" and insert -- 8 μA --, therefor.

Signed and Sealed this
Second Day of September, 2014

Michelle K. Lee

Michelle K. Lee
*Deputy Director of the United States Patent and Trademark Office*

In Column 9, Line 58, delete “low to†” and insert -- low to --, therefor.

In Column 9, Line 59, delete “8 pA” and insert -- 8 μA --, therefor.

In Column 14, Line 65, delete “pixels” and insert -- pixels. --, therefor.